US011937244B2

(12) United States Patent
Karaki et al.

(10) Patent No.: US 11,937,244 B2
(45) Date of Patent: Mar. 19, 2024

(54) UPLINK CONTROL INFORMATION FOR UNLICENSED OPERATION

(71) Applicant: Telefonaktiebolaget LM Ericsson (PUBL), Stockholm (SE)

(72) Inventors: Reem Karaki, Aachen (DE); Jung-Fu Cheng, Fremont, CA (US)

(73) Assignee: Telefonaktiebolagget LM Ericsson (Publ), Stockholm (SE)

(*) Notice: Subject to any disclaimer, the term of this patent is extended or adjusted under 35 U.S.C. 154(b) by 471 days.

(21) Appl. No.: 17/280,512

(22) PCT Filed: Sep. 27, 2019

(86) PCT No.: PCT/EP2019/076270
§ 371 (c)(1),
(2) Date: Mar. 26, 2021

(87) PCT Pub. No.: WO2020/065046
PCT Pub. Date: Apr. 2, 2020

(65) Prior Publication Data
US 2021/0345385 A1   Nov. 4, 2021

Related U.S. Application Data
(60) Provisional application No. 62/738,768, filed on Sep. 28, 2018.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0048* (2013.01); *H04W 72/0446* (2013.01); *H04W 72/1268* (2013.01)

(58) Field of Classification Search
CPC ..... H04W 72/20; H04W 72/21; H04W 72/04; H04W 72/044; H04W 72/0446;
(Continued)

(56) References Cited

U.S. PATENT DOCUMENTS

| 9,235,738 B2* | 1/2016 | Restiau .............. G06K 7/10237 |
| 2008/0052603 A1* | 2/2008 | Wiatrowski .......... H04L 1/0041 714/776 |

(Continued)

FOREIGN PATENT DOCUMENTS

WO    2017 0996860 A1    6/2017

OTHER PUBLICATIONS

PCT Notification of Transmittal of the International Search Report and the Written Opinion of the International Searching Authority, or the Declaration issued for International application No. PCT/EP2019/076270—dated Jan. 2, 2020.

*Primary Examiner* — Jenee Holland
(74) *Attorney, Agent, or Firm* — Christopher & Weisberg, P.A.

(57) ABSTRACT

A method performed by a wireless device (410) includes transmitting an uplink, UL, burst to a network node (460). The UL burst includes UL control information, UCI, multiplexed in a Physical Uplink Shared Channel, PUSCH. The UCI carries one or more parameters for unlicensed operation, and the UL burst has an associated UL burst structure. The UL burst structure includes a first slot, a full slot, and a last slot.

22 Claims, 17 Drawing Sheets

(51) Int. Cl.
  *H04L 27/00* (2006.01)
  *H04W 72/0446* (2023.01)
  *H04W 72/1268* (2023.01)
(58) Field of Classification Search
  CPC ............ H04W 72/12; H04W 72/1263; H04W 72/1268; H04L 5/003; H04L 5/0048
  See application file for complete search history.

(56) References Cited

U.S. PATENT DOCUMENTS

| | | | |
|---|---|---|---|
| 2013/0201975 A1* | 8/2013 | Chen | H04L 5/0053 370/336 |
| 2014/0293942 A1* | 10/2014 | Kang | H04L 5/0037 370/329 |
| 2014/0334408 A1* | 11/2014 | Gao | H04W 72/23 370/329 |
| 2014/0376422 A1* | 12/2014 | Dai | H04L 5/0082 370/336 |
| 2015/0003356 A1* | 1/2015 | Seo | H04L 5/0058 370/329 |
| 2015/0237604 A1* | 8/2015 | Shi | H04W 72/0446 370/330 |
| 2016/0020879 A1* | 1/2016 | Shimezawa | H04W 24/10 370/329 |
| 2016/0037493 A1* | 2/2016 | Kim | H04W 72/23 370/329 |
| 2016/0080184 A1* | 3/2016 | Restiau | G06K 7/10297 375/320 |
| 2016/0100398 A1* | 4/2016 | Xia | H04L 5/0007 370/330 |
| 2016/0192388 A1* | 6/2016 | Ekpenyong | H04L 1/1829 370/329 |
| 2016/0227545 A1* | 8/2016 | Yang | H04L 5/0092 |
| 2016/0270059 A1* | 9/2016 | Chen | H04L 5/0051 |
| 2016/0278089 A1* | 9/2016 | Lee | H04W 72/23 |
| 2016/0360529 A1* | 12/2016 | Lee | H04L 5/0085 |
| 2016/0366697 A1* | 12/2016 | Andersson | H04L 5/0023 |
| 2017/0187503 A1* | 6/2017 | Seo | H04L 27/26 |
| 2017/0272141 A1* | 9/2017 | Horiuchi | H04L 5/0051 |
| 2017/0272214 A1* | 9/2017 | Chen | H04L 5/0044 |
| 2017/0290008 A1* | 10/2017 | Tooher | H04L 1/0003 |
| 2017/0367046 A1* | 12/2017 | Papasakellariou | H04L 5/0048 |
| 2017/0367080 A1* | 12/2017 | Yang | H04L 27/2607 |
| 2018/0091276 A1* | 3/2018 | Huang | H04W 48/12 |
| 2018/0098317 A1* | 4/2018 | Akkarakaran | H04L 1/00 |
| 2018/0124815 A1* | 5/2018 | Papasakellariou | H04L 5/0053 |
| 2018/0132269 A1* | 5/2018 | Wang | H04L 5/0055 |
| 2018/0159704 A1* | 6/2018 | Fechtel | H04L 25/0204 |
| 2018/0167932 A1* | 6/2018 | Papasakellariou | H04L 5/0055 |
| 2018/0167965 A1* | 6/2018 | Wang | H04L 5/0044 |
| 2018/0175987 A1* | 6/2018 | Shao | H04L 5/0053 |
| 2018/0176973 A1* | 6/2018 | Kim | H04W 72/23 |
| 2018/0198594 A1* | 7/2018 | Tiirola | H04L 5/0051 |
| 2018/0199322 A1* | 7/2018 | Takeda | H04L 5/0053 |
| 2018/0206196 A1* | 7/2018 | Wang | H04L 52/343 |
| 2018/0206229 A1* | 7/2018 | Zeng | H04W 72/51 |
| 2018/0212718 A1* | 7/2018 | Takeda | H04L 1/0031 |
| 2018/0227908 A1* | 8/2018 | Wang | H04W 72/21 |
| 2018/0227945 A1* | 8/2018 | Akkarakaran | H04L 5/0092 |
| 2018/0248675 A1* | 8/2018 | Bhattad | H04L 1/0067 |
| 2018/0270814 A1* | 9/2018 | John Wilson | H04L 1/0029 |
| 2018/0278395 A1* | 9/2018 | Yoon | H04L 5/0051 |
| 2018/0278403 A1* | 9/2018 | Yerramalli | H04L 5/0092 |
| 2019/0222380 A1* | 7/2019 | Manolakos | H04L 25/0224 |
| 2019/0327755 A1* | 10/2019 | Xiong | H04L 5/0046 |
| 2020/0045696 A1* | 2/2020 | Huang | H04L 5/10 |
| 2020/0052827 A1* | 2/2020 | Vilaipornsawai | H04L 5/0044 |
| 2020/0404650 A1* | 12/2020 | Chen | H04L 1/08 |
| 2021/0007105 A1* | 1/2021 | Kawasaki | H04L 5/0051 |
| 2021/0153207 A1* | 5/2021 | Bhamri | H04L 5/0051 |
| 2021/0204285 A1* | 7/2021 | Ma | H04W 72/0446 |
| 2021/0329647 A1* | 10/2021 | Park | H04L 1/0038 |
| 2021/0345385 A1* | 11/2021 | Karaki | H04W 72/21 |

* cited by examiner

UPLINK CONTROL INFORMATION FOR UNLICENSED OPERATION

PRIORITY

This nonprovisional application is a U.S. National Stage Filing under 35 U.S.C. § 371 of International Patent Application Serial No. PCT/EP2019/076270 filed and entitled "UPLINK CONTROL INFORMATION FOR UNLICENSED OPERATION" which claims priority to U.S. Provisional Patent Application No. 62/738,768 filed Sep. 28, 2018 both of which are hereby incorporated by reference in their entirety.

TECHNICAL FIELD

Embodiments herein relate generally to the transmission of Uplink Control Information (UCI) for unlicensed operation. More particularly UCI multiplexing in one or more physical uplink shared channel (PUSCH) transmission burst for unlicensed operation.

BACKGROUND

The New Radio (NR) standard in the 3$^{rd}$ Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for either eMBB, URLLC, or other services.

FIG. 1 illustrates an exemplary radio resource in NR. In Release 15 NR, a user equipment (UE) can be configured with up to four carrier bandwidth parts in the downlink (DL) with a single DL carrier bandwidth part being active at a given time. A UE can be configured with up to four carrier bandwidth parts in the uplink (UL) with a single UL carrier bandwidth part being active at a given time. If a UE is configured with a supplementary UL, the UE can, in addition, be configured with up to four carrier bandwidth parts in the supplementary UL with a single supplementary UL carrier bandwidth part being active at a given time.

For a carrier bandwidth part with a given numerology $\mu_i$, a contiguous set of physical resource blocks (PRBs) are defined and numbered from 0 to $N_{BWP,i}^{size}-1$, where i is the index of the carrier bandwidth part. A resource block (RB) is defined as 12 consecutive subcarriers in the frequency domain.

Multiple OFDM numerologies, $\mu$, are supported in NR as given by Table 1 below, where the subcarrier spacing, $\Delta f$, and the cyclic prefix (CP) for a carrier bandwidth part are configured by different higher layer parameters for DL and UL, respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A DL physical channel corresponds to a set of resource elements carrying information originating from higher layers. The following DL physical channels are defined: Physical Downlink Shared Channel (PDSCH); Physical Broadcast Channel (PBCH); and Physical Downlink Control Channel (PDCCH). PDSCH is the main physical channel used for unicast DL data transmission, but also for transmission of random access response (RAR), certain system information blocks (SIBs), and paging information. PBCH carries the basic system information required by the UE to access the network. PDCCH is used for transmitting DL control information (DCI), mainly scheduling decisions, required for reception of PDSCH, and for UL scheduling grants enabling transmission on the Physical Uplink Shared Channel (PUSCH).

An UL physical channel corresponds to a set of resource elements carrying information originating from higher layers. The following UL physical channels are defined: PUSCH; Physical Uplink Control Channel (PUCCH); and Physical Random Access Channel (PRACH). PUSCH is the UL counterpart to the PDSCH. PUCCH is used by UEs to transmit UL control information, including Hybrid Automatic Repeat Request (HARQ) acknowledgements, channel state information (CSI) reports, etc. PRACH is used for random access preamble transmission.

In general, a UE shall determine the RB assignment in frequency domain for PUSCH or PDSCH using the resource allocation field in the detected DCI carried in PDCCH. For PUSCH carrying msg3 in a random-access procedure, the frequency domain resource assignment is signaled by using the UL grant contained in RAR.

In NR, two frequency resource allocation schemes, type 0 and type 1, are supported for PUSCH and PDSCH. Which type to use for a PUSCH/PDSCH transmission is either defined by a radio resource control (RRC) configured parameter or indicated directly in the corresponding DCI or UL grant in RAR (for which type 1 is used).

The RB indexing for UL/DL type 0 and type 1 resource allocation is determined within the UE's active carrier bandwidth part, and the UE shall, upon detection of PDCCH intended for the UE, determine first the UL/DL carrier bandwidth part and then the resource allocation within the carrier bandwidth part. The UL bandwidth part for PUSCH carrying msg3 is configured by higher layer parameters.

For cell search and initial access, these channels are included: Synchronization Signal (SS)/PBCH block, PDSCH carrying Remaining Minimum System Information (RMSI)/RAR/MSG4 scheduled by PDCCH channels carrying DCI, PRACH channels and PUSCH channel carrying MSG3.

The synchronization signal and PBCH block (SS/PBCH block, or SSB in shorter format) comprises the above signals (Primary Synchronization Signal (PSS), Secondary Synchronization Signal (SSS), and PBCH Demodulation Reference Signal (DMRS)), and PBCH. The SSB may have 15 kHz, 30 kHz, 120 kHz or 240 kHz subcarrier spacing (SCS) depending on the frequency range.

In the 3GPP NR standard, DCI is received over PDCCH. The PDCCH may carry DCI in messages with different formats. DCI format 0_0 and 0_1 are DCI messages used to convey UL grants to the UE for transmission of the PUSCH. DCI format 1_0 and 1_1 are used to convey DL grants for transmission of the PDSCH. Other DCI formats (2_0, 2_1, 2_2 and 2_3) are used for other purposes such as transmission of slot format information, reserved resource, transmit power control information, etc.

A PDCCH candidate is searched within a common or UE-specific search space which is mapped to a set of time and frequency resources referred to as a control resource set (CORESET). The search spaces within which PDCCH candidates must be monitored are configured to the UE via RRC signaling. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG), which is defined as spanning 1 PRB×1 OFDM symbol in frequency and time. Each REG contains DMRS to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the UE by estimating the channel over multiple REGs that are proximate in time and frequency if the precoder used at the transmitter for the REGs is not different. To assist the UE with channel estimation, the multiple REGs can be grouped together to form a REG bundle and the REG bundle size for a CORESET is indicated to the UE. The UE may assume that any precoder used for the transmission of the PDCCH is the same for all the REGs in the REG bundle. A REG bundle may consist of 2, 3 or 6 REGs.

A control channel element (CCE) consists of 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

Interleaving can provide frequency diversity. Not using interleaving is beneficial for cases where knowledge of the channel allows the use of a precoder in a particular part of the spectrum improve the signal-to-interference-plus-noise ratio (SINR) at the receiver.

A PDCCH candidate may span 1, 2, 4, 8 or 16 CCEs. If more than one CCE is used, the information in the first CCE is repeated in the other CCEs. Therefore, the number of aggregated CCEs used is referred to as the aggregation level for the PDCCH candidate.

A hashing function is used to determine the CCEs corresponding to PDCCH candidates that a UE must monitor within a search space set. The hashing is done differently for different UEs so that the CCEs used by the UEs are randomized and the probability of collisions between multiple UEs for which PDCCH messages are included in a CORESET is reduced.

An NR slot consists of several OFDM symbols, according to current agreements either 7 or 14 symbols (OFDM subcarrier spacing ≤60 kHz) and 14 symbols (OFDM subcarrier spacing >60 kHz).

FIG. 2 illustrates an example subframe with 14 OFDM symbols. In FIG. 2, $T_s$ and $T_{symb}$ denote the slot and OFDM symbol duration, respectively.

In addition, a slot may also be shortened to accommodate DL/UL transient period or both DL and UL transmissions. FIG. 3 illustrates potential slot variations.

Furthermore, NR also defines Type B scheduling, also known as mini-slots. Mini-slots are shorter than slots (according to current agreements from 1 or 2 symbols up to number of symbols in a slot minus one) and can start at any symbol. Mini-slots are used if the transmission duration of a slot is too long or the occurrence of the next slot start (slot alignment) is too late. Applications of mini-slots include, among others, latency critical transmissions (in this case both mini-slot length and frequent opportunity of mini-slot are important) and unlicensed spectrum where a transmission should start immediately after listen-before-talk succeeded (here the frequent opportunity of mini-slot is especially important).

FIG. 4 illustrates an example of a mini-slot with 2 OFDM symbols.

NR supports two types of pre-configured resources, both of which are different flavors of existing Long Term Evolution (LTE) semi-persistent scheduling (SPS) with some further aspects such as supporting repetitions for a transport block (TB). In Type 1, UL data transmission with configured grant is only based on RRC (re)configuration without any L1 signaling. Type 2 is very similar to the LTE SPS feature. UL data transmission with configured grant is based on both RRC configuration and L1 signaling for activation/deactivation of the grant. The gNB needs to explicitly activate the configured resources on PDCCH, and the UE confirms the reception of the activation/deactivation grant with a Medium Access Control (MAC) control element.

Repetition of a TB is also supported in NR, and the same resource configuration is used for K repetitions for a TB including the initial transmission. The possible values of K are {1, 2, 4, 8}. Repetitions follow an RV sequence configured by UE-specific RRC signaling to one of the following: Sequence {0, 2, 3, 1} or {0, 3, 0, 3} or {0, 0, 0, 0}.

SUMMARY

Certain aspects of the present disclosure and their embodiments may provide solutions to these or other challenges. For example, certain embodiments provide for the content of the configured uplink (UL) grant UL Control Information (UCI) as well as methods for mapping of the UCI and identifying if the user equipment (UE) transmits mini-slot or slots.

According to certain embodiments, a method performed by a wireless device includes transmitting an UL burst to a network node. The UL burst comprises UCI multiplexed in a Physical Uplink Shared Channel (PUSCH). The UCI carries one or more parameters for unlicensed operation, and the UL burst has an associated UL burst structure. The UL burst structure comprises a first slot, a full slot, and a last slot.

According to certain embodiments, a wireless device is configured to transmit an UL burst to a network node. The UL burst comprises UCI multiplexed in a PUSCH. The UCI carries one or more parameters for unlicensed operation, and the UL burst has an associated UL burst structure. The UL burst structure comprises a first slot, a full slot, and a last slot.

According to certain embodiments, a method performed by a base station includes receiving an UL burst from a wireless device. The UL burst includes UCI multiplexed in a PUSCH. The UCI carries one or more parameters for unlicensed operation, and the UL burst has an associated UL burst structure. The UL burst structure includes a first slot, a full slot, and a last slot.

According to certain embodiments, a base station is configured to receive an UL burst from a wireless device. The UL burst includes UCI multiplexed in a PUSCH. The UCI carries one or more parameters for unlicensed operation, and the UL burst has an associated UL burst structure. The UL burst structure includes a first slot, a full slot, and a last slot.

Certain embodiments may provide one or more of the following technical advantage(s). For example, certain embodiments may advantageously define the contents of the configured UL grant UCI. As another example, certain embodiments may advantageously enable UCI that carries unlicensed operation parameters. As still another example, certain embodiments may advantageously increase the channel access granularity while allowing a wireless device to also use slot-based transmission. As yet a further example, certain embodiments may advantageously facilitate mapping of the UCI. As another example, certain embodiments may advantageously enable a network node to identify whether a wireless device transmits within mini-slots or slots.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
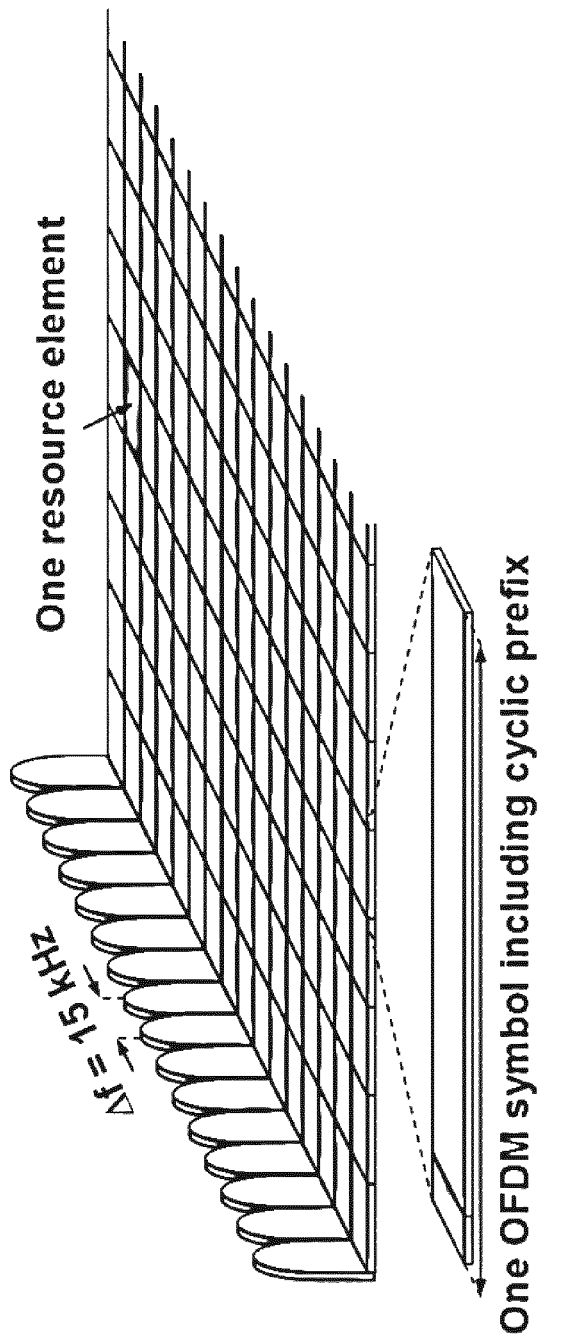
FIG. 1 illustrates an exemplary radio resource in NR.
Figure 2:
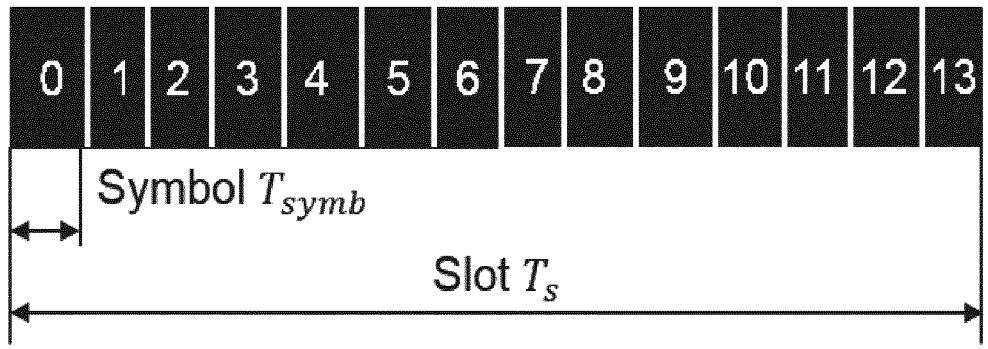
FIG. 2 illustrates an example subframe with 14 OFDM symbols.
Figure 3:
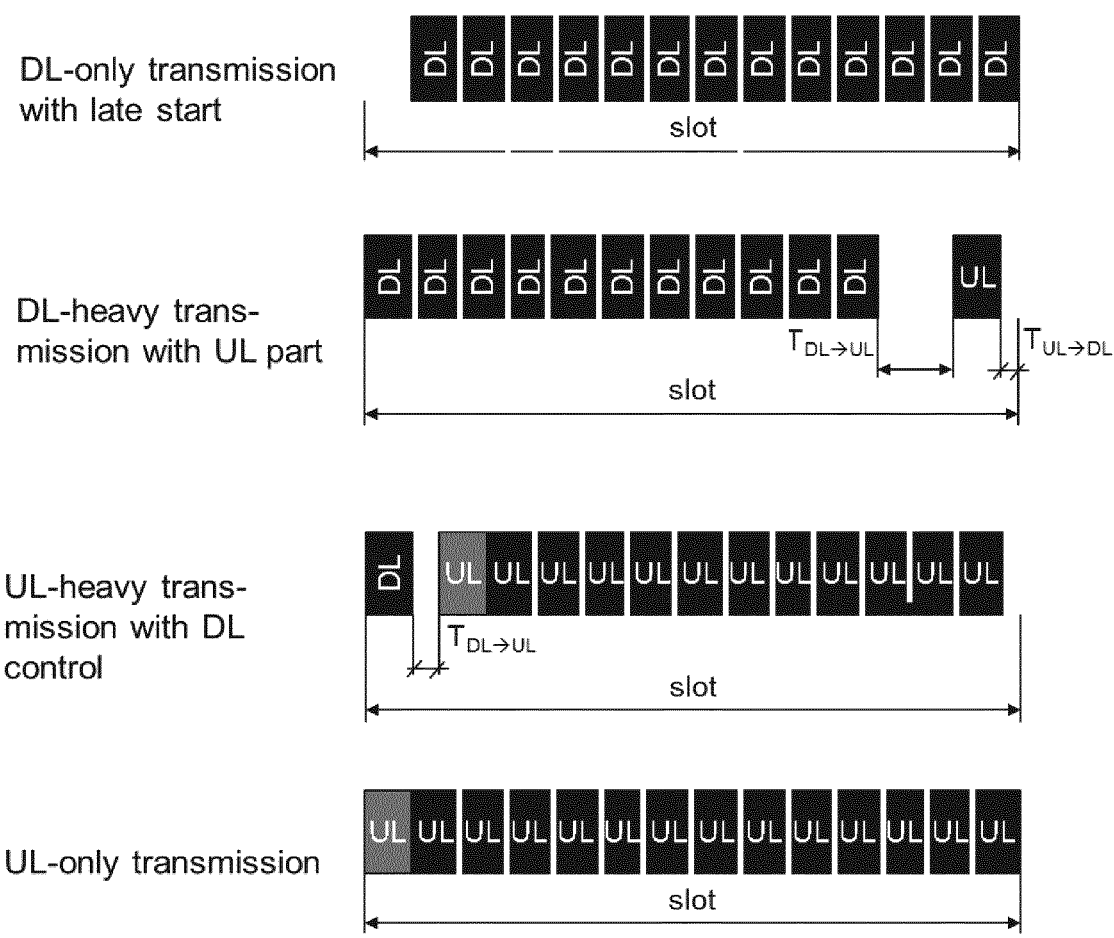
FIG. 3 illustrates potential slot variations.
Figure 4:
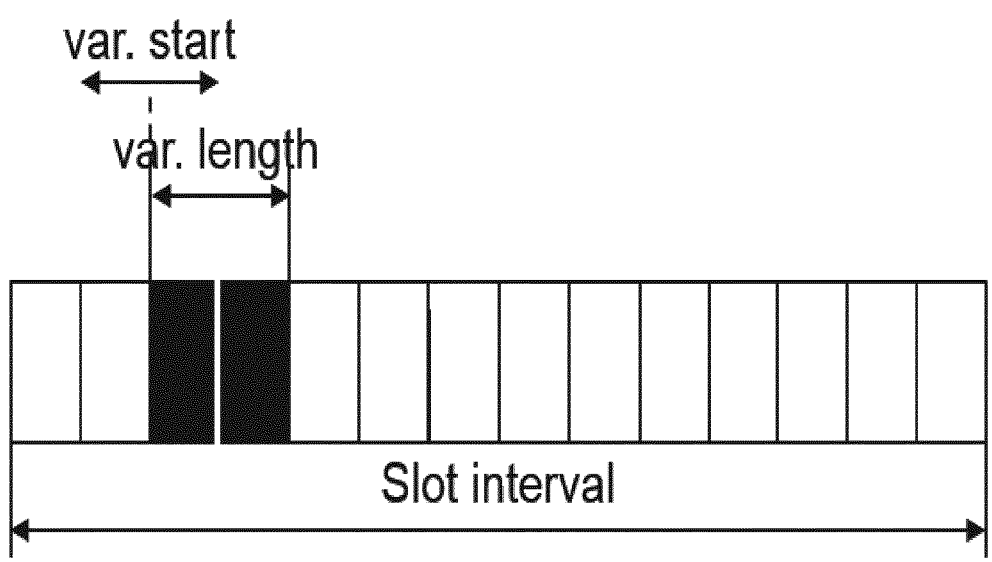
FIG. 4 illustrates an example of a mini-slot with 2 OFDM symbols.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For a node to be allowed to transmit in unlicensed spectrum (e.g., the 5 GHz band), it typically needs to perform a clear channel assessment (CCA). This procedure typically includes sensing the medium to be idle for a number of time intervals. Sensing the medium to be idle can be done in different ways, such as using energy detection, preamble detection or using virtual carrier sensing, where the latter implies that the node reads control information from other transmitting nodes informing when a transmission ends. After sensing the medium idle, a node is typically allowed to transmit for a certain amount of time, sometimes referred to as transmission opportunity (TXOP). The length of the TXOP depends on regulation and the type of CCA that has been performed, but typically ranges from 1 ms to 10 ms.

The mini-slot concept in NR allows a node to access the channel at a much finer granularity compared to, for example, LTE Licensed Assisted Access (LAA), where the channel could only be accessed at 500 us intervals. Using, for example, 60 kHz SCS and a two symbol mini-slot in NR, the channel can be accessed at 36 us intervals.

There currently exist certain challenge(s). Firstly, NR-Unlicensed (NR-U) should support new UL control information (UCI) for configured UL that carries unlicensed operation parameters, similar to that proposed under the 3GPP work item for further enhancements to licensed assisted autonomous uplink UCI (feLAA AUL-UCI). Secondly, mini-slot transmission helps increase the channel access granularity but increases the signalling overhead. It is recommended to use mini-slot to enhance the chances to access the channel. However, once the channel occupancy time (COT) is initiated, UE should switch to slot-based transmission. However, given that the gNB does not know when the UE will transmit on the configured UL resources, the gNB does not know when the UE will transmit using mini-slot or slot transmission. Furthermore, the existing configured UL grant does not support such dynamic switching between the two. Herein, the initial PUSCH transmissions, or UL bursts, comprising UCI information is further considered.

Figure 5:
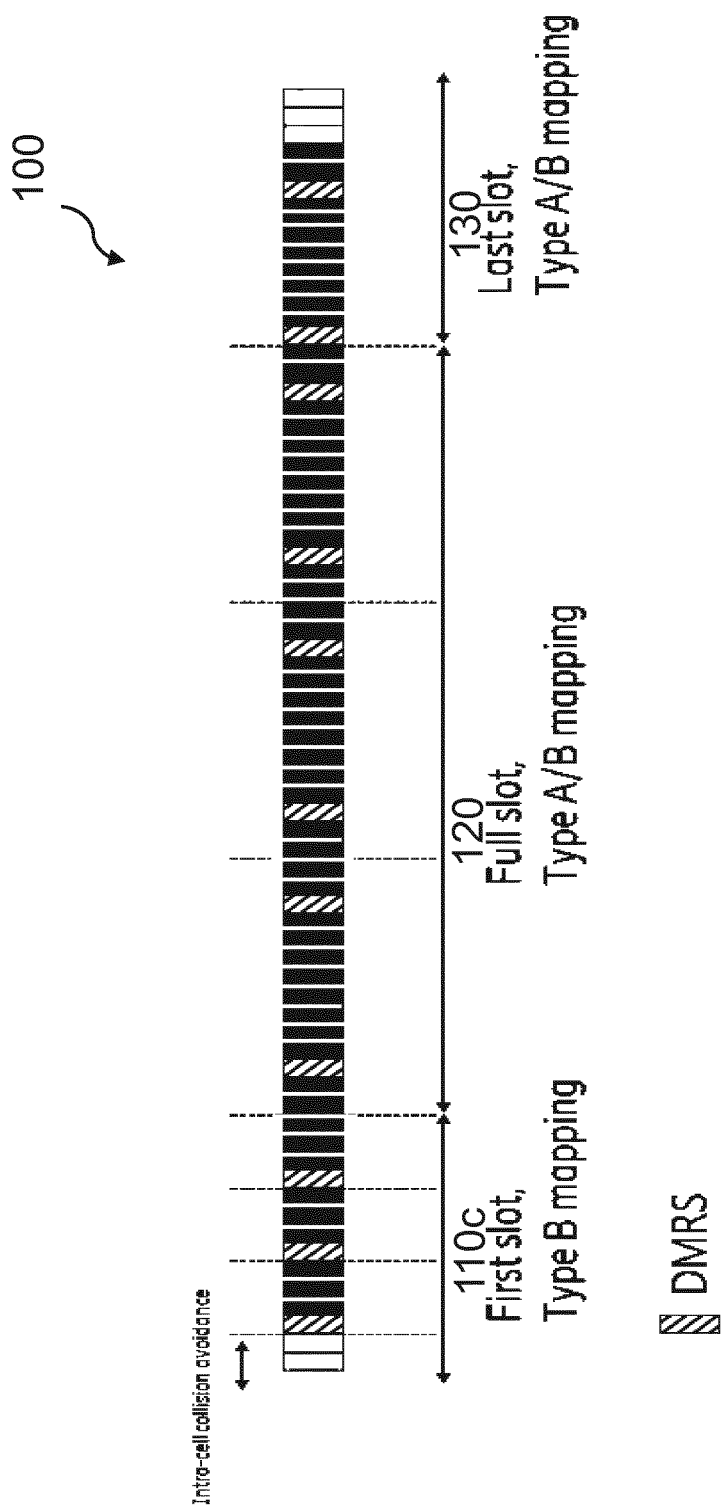
FIG. 5 illustrates an example of an UL burst structure, according to certain embodiments.

FIG. 5 illustrates an example of an UL burst structure 100, in accordance with certain embodiments. As depicted, the burst structure may be divided into three parts: a first slot 110; full slots 120; and a last slot 130.

The first slot 110 consists of one or multiple mini slots. Type B scheduling (referred to as Type B mapping in FIG. 5 above) is used for PUSCH transmission within the first slot.

A PUSCH transmission occupies the full slot 120. In here, the mapping type (also referred to herein as scheduling type) can be Type A or Type B, see for example 3GPP TS 38.214 V15.2.0, clause 5.1.2. The mapping time for the full slots can be higher layer configured or signaled in the activation DCI.

With regard to the last slot 130, PUSCH Transmission may occupy less than the full slot (end at symbol <=13). The mapping type can be:
  Same as full slots
  Different than the mapping used for full slots.
  Signaled separately by RRC configuration or using L1 signaling.

According to certain embodiments, the UE may be configured by one or multiple ending position that apply to the last slot in the burst. The ending positions may be indicated by RRC signaling or L1 signaling.

According to certain embodiments, a different DMRS pattern may be used for different parts. For example, in certain embodiments, each part in the slot can be distinguished by using a different DMRS pattern. The gNB detects the DMRS signals in every slot, and accordingly find out if the slot is the first, full, or last slot of the burst.

In certain embodiments, if a first slot 110 is detected, the gNB may assume that the PUSCH transmission(s) follow a predefined mini-slot pattern (i.e., the PUSCH transmission(s) length follow a certain higher layer configuration). Accordingly, configured grant UCI is mapped per PUSCH transmission.

In certain embodiments, the AUL-UCI may be multiplexed in the AUL PUSCH according to one or more of the following alternatives:
  Coded AUL-UCI bits shall be multiplexed with data according to the procedures for CSI part 1;
  Coded AUL-UCI bits are concatenated with coded bits of CSI part 1 if available.
  Mapped from first symbol available after front-loaded DM-RS(s).
  Mapped from first non-DRMS symbol available after first DM-RS(s).

In some cases, the exact location of UCI depends on the DMRS pattern used in the slot or mini-slot. Therefore, from one slot to another, the UCI location is not necessarily fixed at same symbols of a slot.

According to certain other embodiments, the same DMRS pattern may be used for different parts. This alternative advantageously makes it easier for the gNB to detect only one DMRS pattern used in all cases first slot 110, full slots 120, and last slot 130.

In certain embodiments, the UCI coded bits length may be independent of PUSCH length or assume a predefined value for the PUSCH length instead of the actual one.

The UCI mapping may start after the first DMRS symbol in a PUSCH transmission. In certain embodiments, the UCI may indicate one or more of the following:
  First symbol of the corresponding PUSCH/index to a predefined set of possible starting symbols;
  Last symbol of the corresponding PUSCH/index to a predefined set of possible last symbols; an
  Length of the PUSCH.

In certain embodiments, the first slot 110 might contain one or more mini-slot, each carrying its own UCI. In certain embodiments, the gNB may do the detection in sequential order. After decoding the first UCI that happens to be after the first DMRS symbol, the gNB knows the start and end of the corresponding mini-slot, and the start of the next mini-slot in the slot. The UCI for the next mini-slot is mapped after the first DMRS symbol in that mini-slot. And so on. Alternatively, in certain embodiments the gNB may do blind detection for UCI presence mapped immediately in the next symbol after each DMRS symbol in a slot.

In still another embodiment, the DMRS pattern for the full 120/last slot 130 may include a subset of the DMRS symbols of the pattern for the first slot.

Figure 6:
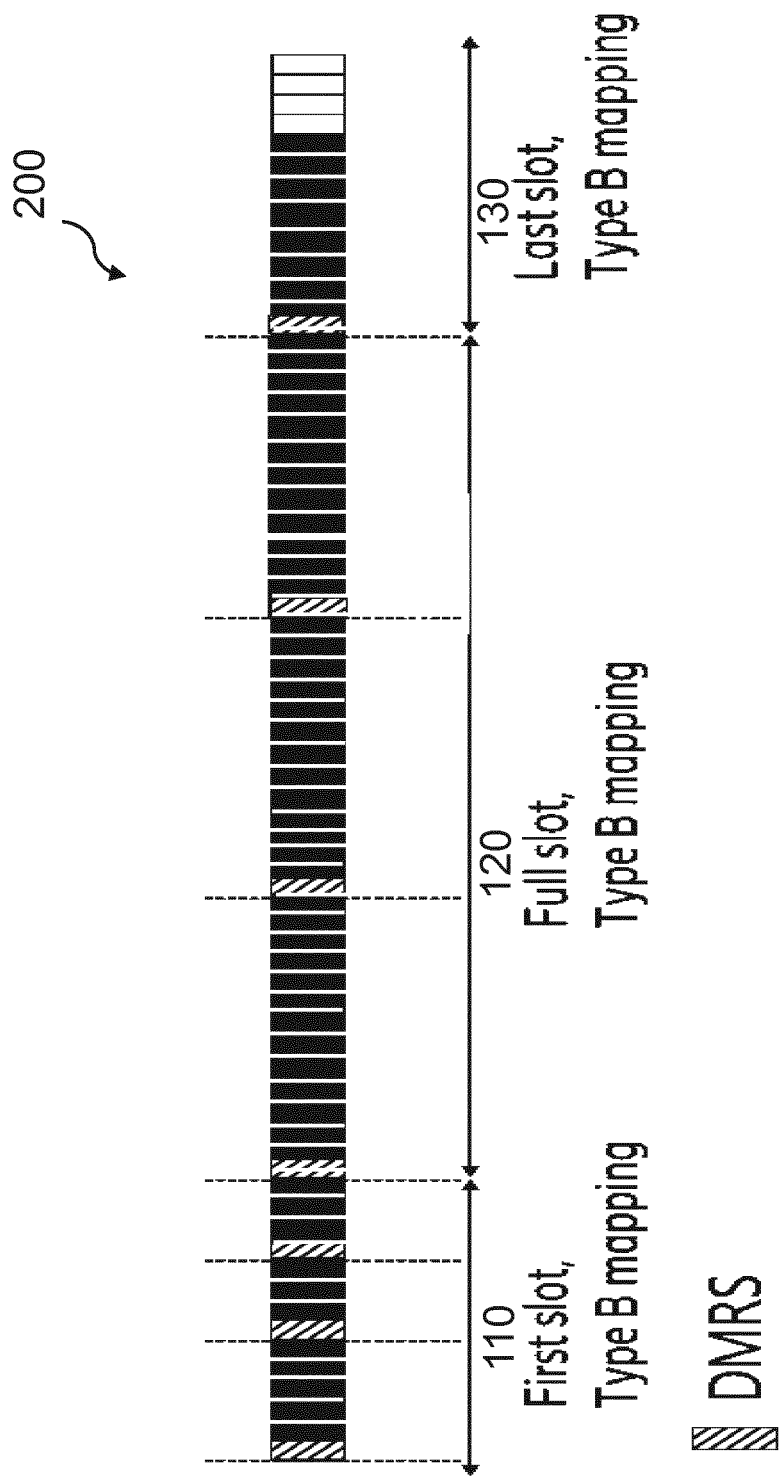
FIG. 6 illustrates an example scenario in which the DMRS pattern for the full/last slot includes a subset of the DMRS symbols in the pattern for the first slot, according to certain embodiments.

FIG. 6 illustrates an example scenario in which a DMRS pattern 200 for the full/last slot includes a subset of the DMRS symbols in the pattern for the first slot 110, in accordance with certain embodiments.

As can be seen from FIG. 6, the first slot (which in the example of FIG. 6 is composed of 3 mini-slots), has 3 DMRS symbols at {#0,#6,#10}. The full slot 120 and last slot 130, meanwhile, have one DMRS at #0. In certain embodiments, based on the detected DMRS signals, the gNB determines whether the slot is a first slot 110 of the burst based on whether the slot contains more DRMS signals than the other slots. Since the mini-slot pattern is preconfigured, the UCI location per mini-slot is known for the gNB, and similarly for the full slot 120 and last slot 130.

In certain embodiments, to distinguish between full slot 120 and last slot 130, the PUSCH length or last symbol of the PUSCH may be indicated in the UCI. The UCI coded bits length may be independent of PUSCH length or may assume a predefined value for the PUSCH length instead of the actual one.

In certain embodiments, there may be a single DMRS per slot/mini-slot.

Figure 7:
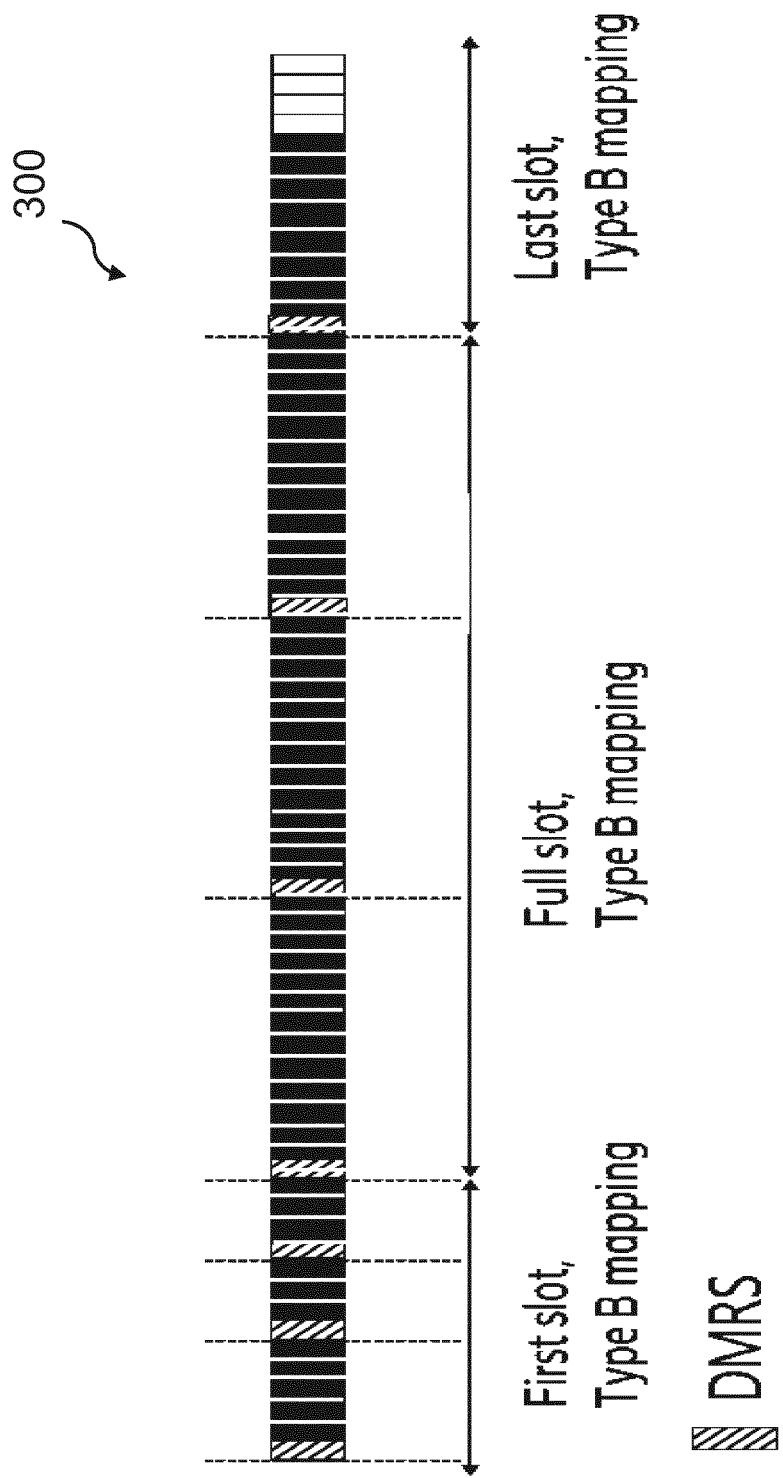
FIG. 7 illustrates an example scenario in which there is a single DMRS per slot/mini-slot, according to certain embodiments.

FIG. 7 illustrates an example scenario 300 in which there is a single DMRS per slot/mini-slot, in accordance with certain embodiments. As depicted, DMRS detection marks the start of a slot/mini-slot. In certain embodiments, the gNB may assume that the slot/mini-slot extends until the earliest time between: a symbol preceding the next detected DMRS from the same UE; or the last symbol in the slot.

Alternatively, in certain embodiments the UCI that start in the immediate symbol after the detected DMRS may indicate the ending symbol or length of the PUSCH, given that the UCI length is independent of the PUSCH length or assumes a predefined value for the PUSCH length instead of the actual one.

In certain embodiments, the UE may need to indicate where the PUSCH ends in the UCI. This is especially needed if:
  full slots and last slot follow the same mapping type; or
  multiple ending positions are enabled/configured, since there are cases where different PUSCH durations have same DMRS pattern (Type B PUSCH transmission <5 symbols).

In certain embodiments, the UE may indicate at least one of the following: PUSCH length; symbol index where the PUSCH ends; and index to a predefined set of possible ending points. In certain embodiments, if code block group (CBG) is used, the UE may indicate one of the following: indices of the CBG that is transmitted/retransmitted; or a bitmap, where each bit corresponds to a CBG. The bit may be set to 1 to indicate that the CBG is included in this transmission.

In certain embodiments, an LBT or a gap indication may be included to indicate if the gNB should perform quick CCA check before the DL transmission or skip it. In certain embodiments, the indication may be one bit that is set to true in the first PUSCH transmission in the UL burst and false for the remaining PUSCH in the UL burst. If the gNB detects LBT indication to be true, it means that quick CCA check can be skipped before the upcoming DL part of the shared COT. Alternatively, in certain embodiments the bit may be set true in the PUSCH transmission(s) in the UL burst. If the gNB detects LBT indication to true, it means that quick CCA check can be skipped before the upcoming DL part of the shared COT. Alternatively, in certain embodiments the bit may be set true in slot n-X, where n is the slot that is applicable for DL transmission. In some cases, X may be fixed or higher layer configured. In certain embodiments, if there is a small gap (~2/3 symbols) between the UL transmission and the start of the DL transmission, the gap may be filled by extending the CP of the DL transmission.

In certain embodiments, a length of the upcoming DL part in the shared COT in terms of slots or symbols may be included. In certain embodiments, a COT sharing indication may be included. For example, in certain embodiments the COT sharing indication may be 1 bit indicating if slot n+X is an applicable slot for UL to DL sharing. In some cases, X may be configured by the gNB as part of RRC configuration.

Figure 8:
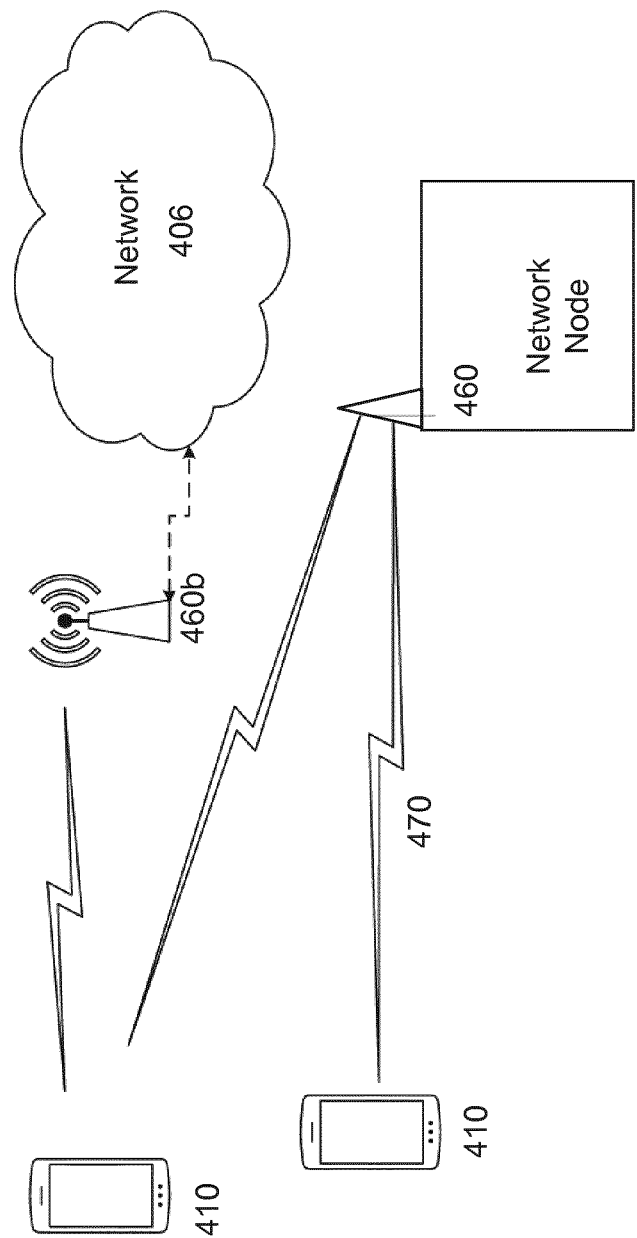
FIG. 8 illustrates an example wireless network, according to certain embodiments.

FIG. 8 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 406, network nodes 460 and 460b, and wireless devices 410. In practice, a wireless network may further include any additional elements suitable to support communication between wireless devices or between a wireless device and another communication device, such as a landline telephone, a service provider, or any other network node or end device. Of the illustrated components, network node 460 and wireless device 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and wireless device 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
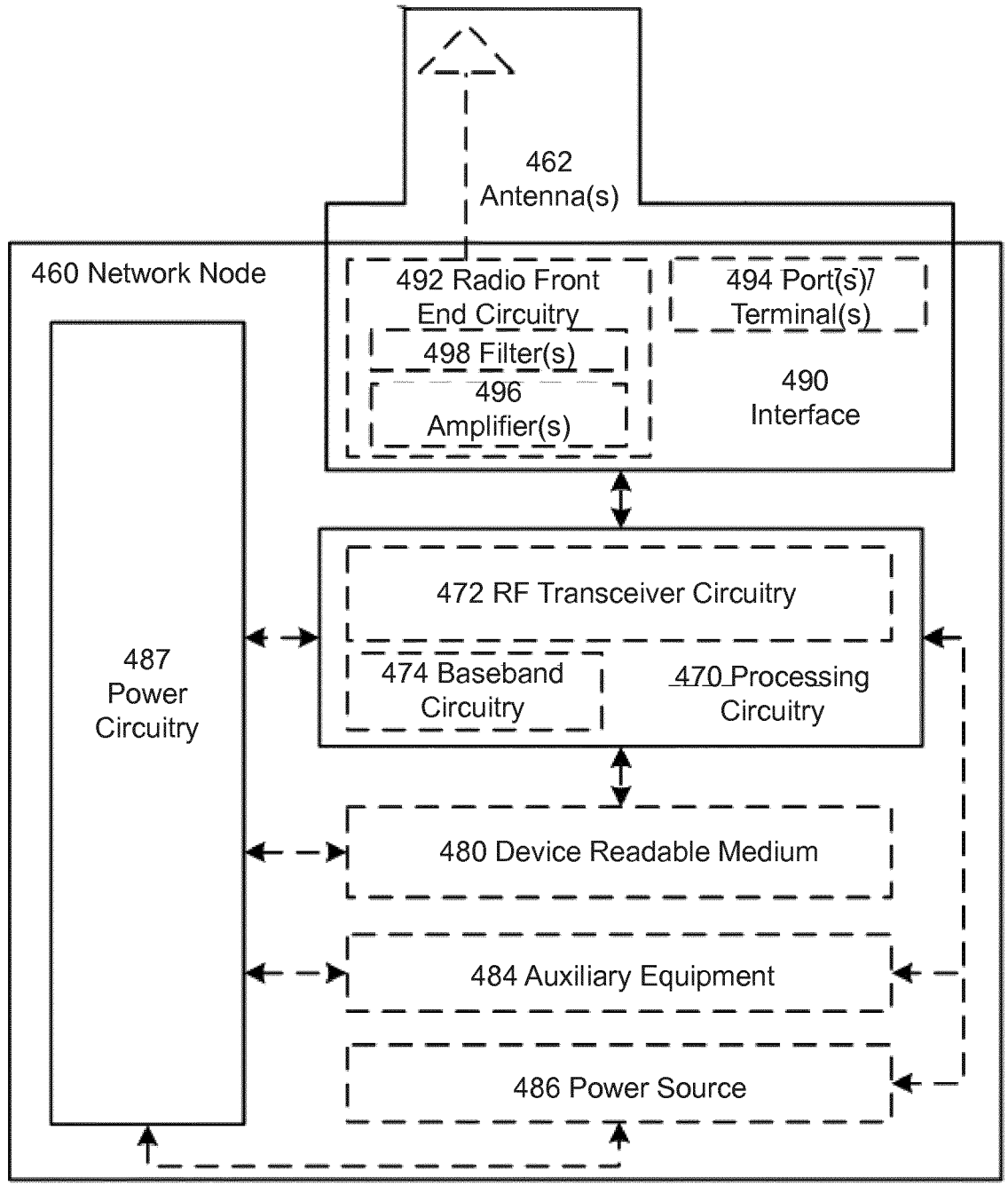
FIG. 9 illustrates an example network node, according to certain embodiments.

FIG. 9 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 460 includes processing circuitry 470, device readable medium 480, interface 490, auxiliary equipment 484, power source 486, power circuitry 487, and antenna 462. Although network node 460 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

According to certain embodiments, processing circuitry 470 may execute instructions stored in device readable medium 480 or in memory within processing circuitry 470 to cause network node 460 to receive an UL burst from a wireless device 410. The UL burst includes UCI multiplexed in a PUSCH. The UCI may carry one or more parameters for unlicensed operation, and the UL burst may have an associated UL burst structure that includes a first slot, a full slot, and a last slot.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or wireless devices 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or wireless devices via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 9 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

Figure 10:
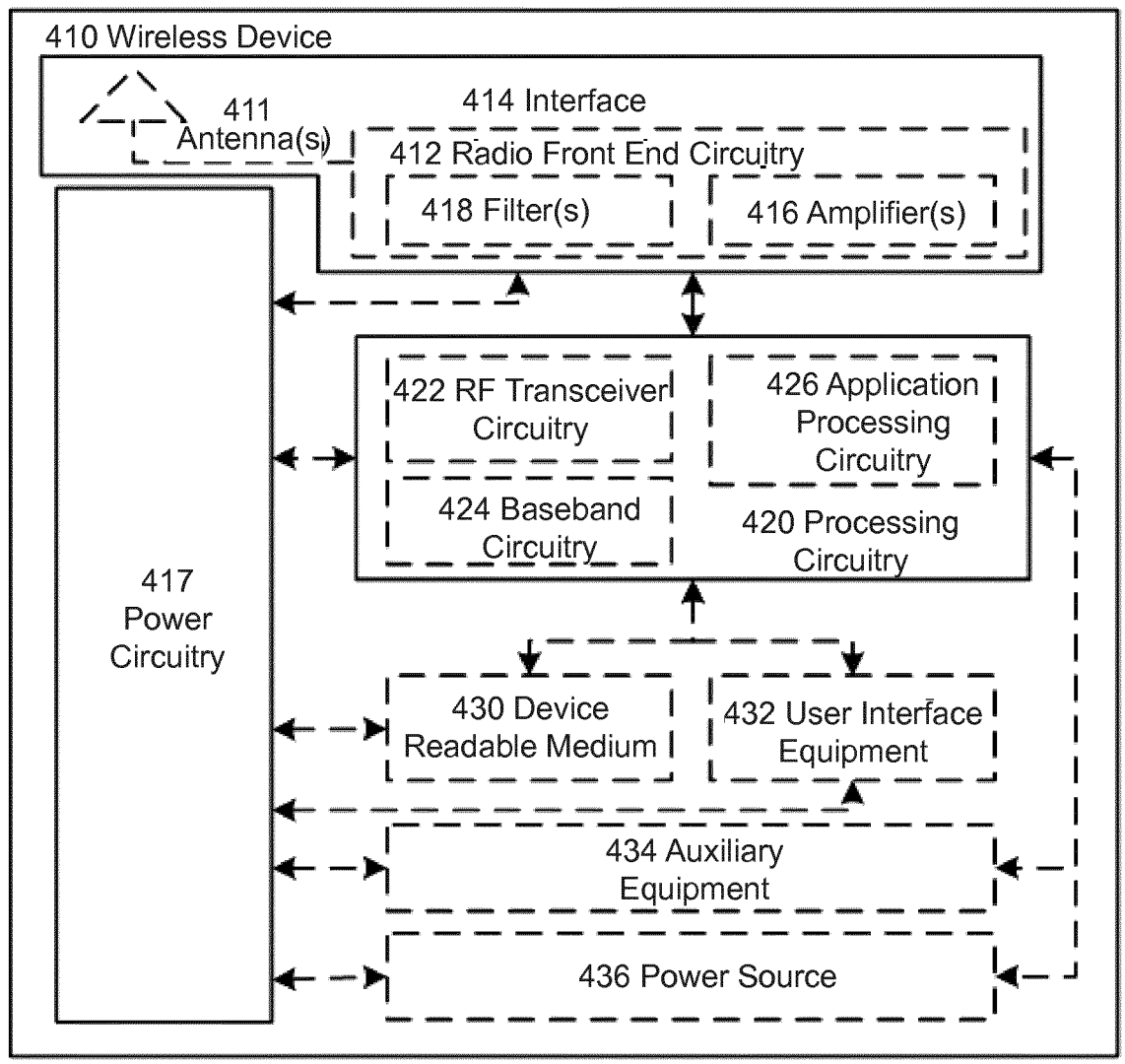
FIG. 10 illustrates an example wireless device, according to certain embodiments.

FIG. 10 illustrates an example wireless device 410, according to certain embodiments. As used herein, wireless device (wireless device) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. Wireless device 410 may include multiple sets of one or more of the illustrated components for different wireless technologies supported by wireless device 410, such as, for example, GSM, WCDMA, LTE, NR, WiFi, WiMAX, or Bluetooth wireless technologies, just to mention a few. These wireless technologies may be integrated into the same or different chips or set of chips as other components within wireless device 410.

Antenna 411 may include one or more antennas or antenna arrays, configured to send and/or receive wireless signals, and is connected to interface 414. In certain alternative embodiments, antenna 411 may be separate from wireless device 410 and be connectable to wireless device 410 through an interface or port. Antenna 411, interface 414, and/or processing circuitry 420 may be configured to perform any receiving or transmitting operations described herein as being performed by a wireless device. Any information, data and/or signals may be received from a network node and/or another wireless device. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, wireless device 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or wireless devices via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 410 components, such as device readable medium 430, wireless device 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of wireless device 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a wireless device may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hardwired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of wireless device 410, but are enjoyed by wireless device 410 as a whole, and/or by end users and the wireless network generally.

Processing circuitry 420 may be configured to perform any determining, calculating, or similar operations (e.g., certain obtaining operations) described herein as being performed by a wireless device. These operations, as performed by processing circuitry 420, may include processing information obtained by processing circuitry 420 by, for example, converting the obtained information into other information, comparing the obtained information or converted information to information stored by wireless device 410, and/or performing one or more operations based on the obtained information or converted information, and as a result of said processing making a determination.

According to certain embodiments, for example, processing circuitry 420 may execute the instructions to cause the wireless device 410 to transmit an UL burst to a network node 460. The UL burst may include UCI multiplexed in a PUSCH, and the UCI may carry one or more parameters for unlicensed operation. The UL burst may have an associated UL burst structure that includes a first slot, a full slot, and a last slot.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with wireless device 410. Such interaction may be of many forms, such as visual, audial, tactile, etc. User interface equipment 432 may be operable to produce output to the user and to allow the user to provide input to wireless device 410. The type of interaction may vary depending on the type of user interface equipment 432 installed in wireless device 410. For example, if wireless device 410 is a smart phone, the interaction may be via a touch screen; if wireless device 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into wireless device 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from wireless device 410, and to allow processing circuitry 420 to output information from wireless device 410. User interface equipment 432 may include, for example, a speaker, a display, vibrating circuitry, a USB port, a headphone interface, or other output circuitry. Using one or more input and output interfaces, devices, and circuits, of user interface equipment 432, wireless device 410 may communicate with end users and/or the wireless network, and allow them to benefit from the functionality described herein.

Auxiliary equipment 434 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. Wireless device 410 may further comprise power circuitry 437 for delivering power from power source 436 to the various parts of wireless device 410 which need power from power source 436 to carry out any functionality described or indicated herein. Power circuitry 437 may in certain embodiments comprise power management circuitry. Power circuitry 437 may additionally or alternatively be operable to receive power from an external power source; in which case wireless device 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of wireless device 410 to which power is supplied.

Figure 11:
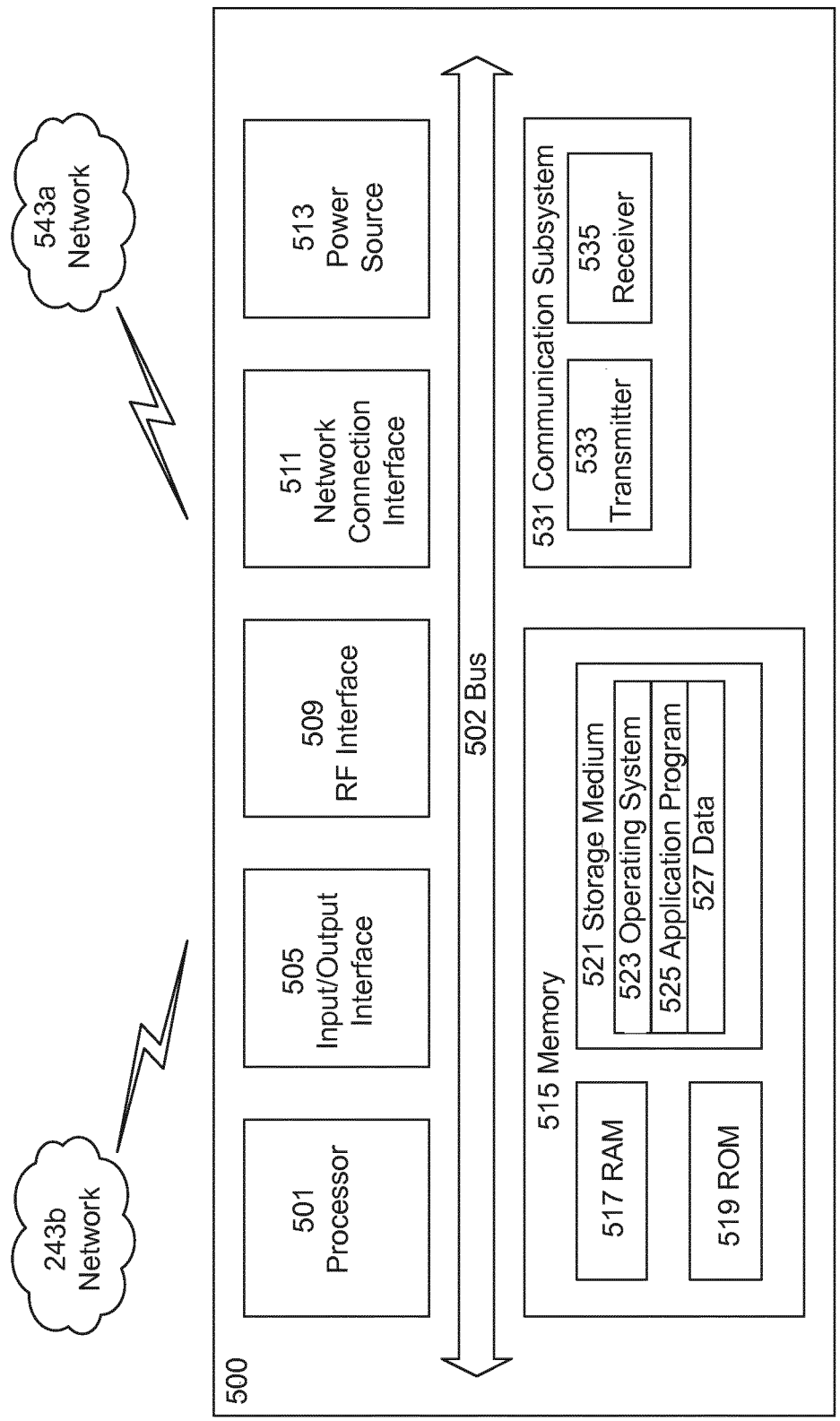
FIG. 11 illustrate an example user equipment, according to certain embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the $3^{rd}$ Generation Partnership Project (3GPP), including a NB-IoT UE, a machine type communication (MTC) UE, and/or an enhanced MTC (eMTC) UE. UE 500, as illustrated in FIG. 5, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 5 is a UE, the components discussed herein are equally applicable to a wireless device, and vice-versa.

In FIG. 11, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof For example, the input device may be an accelerometer, a magnetometer, a digital camera, a microphone, and an optical sensor.

In FIG. 11, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 11, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another wireless device, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 12:
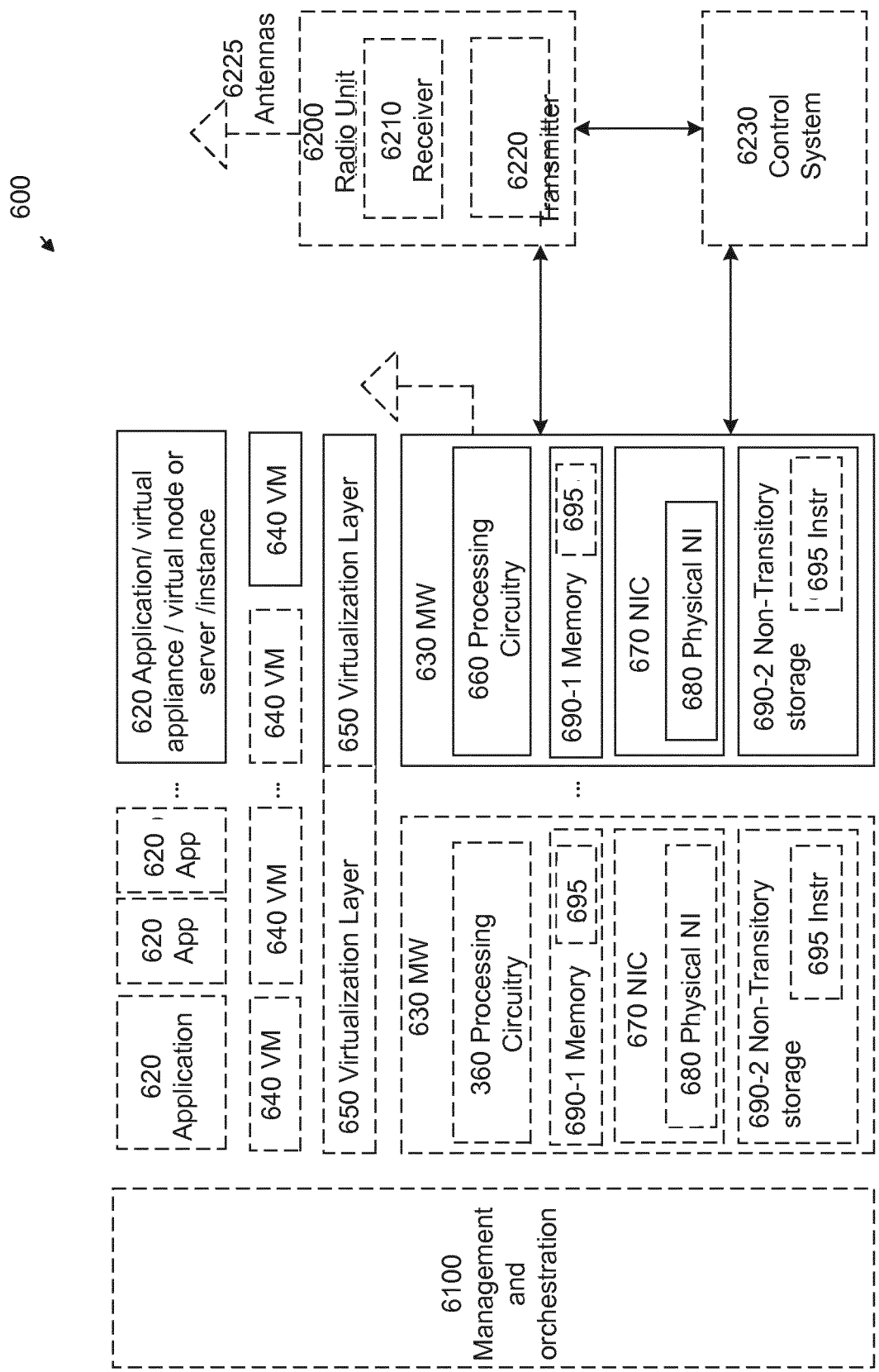
FIG. 12 illustrates a virtualization environment in which functions implemented by some embodiments may be virtualized, according to certain embodiments.

FIG. 12 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 12, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 12.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 13:
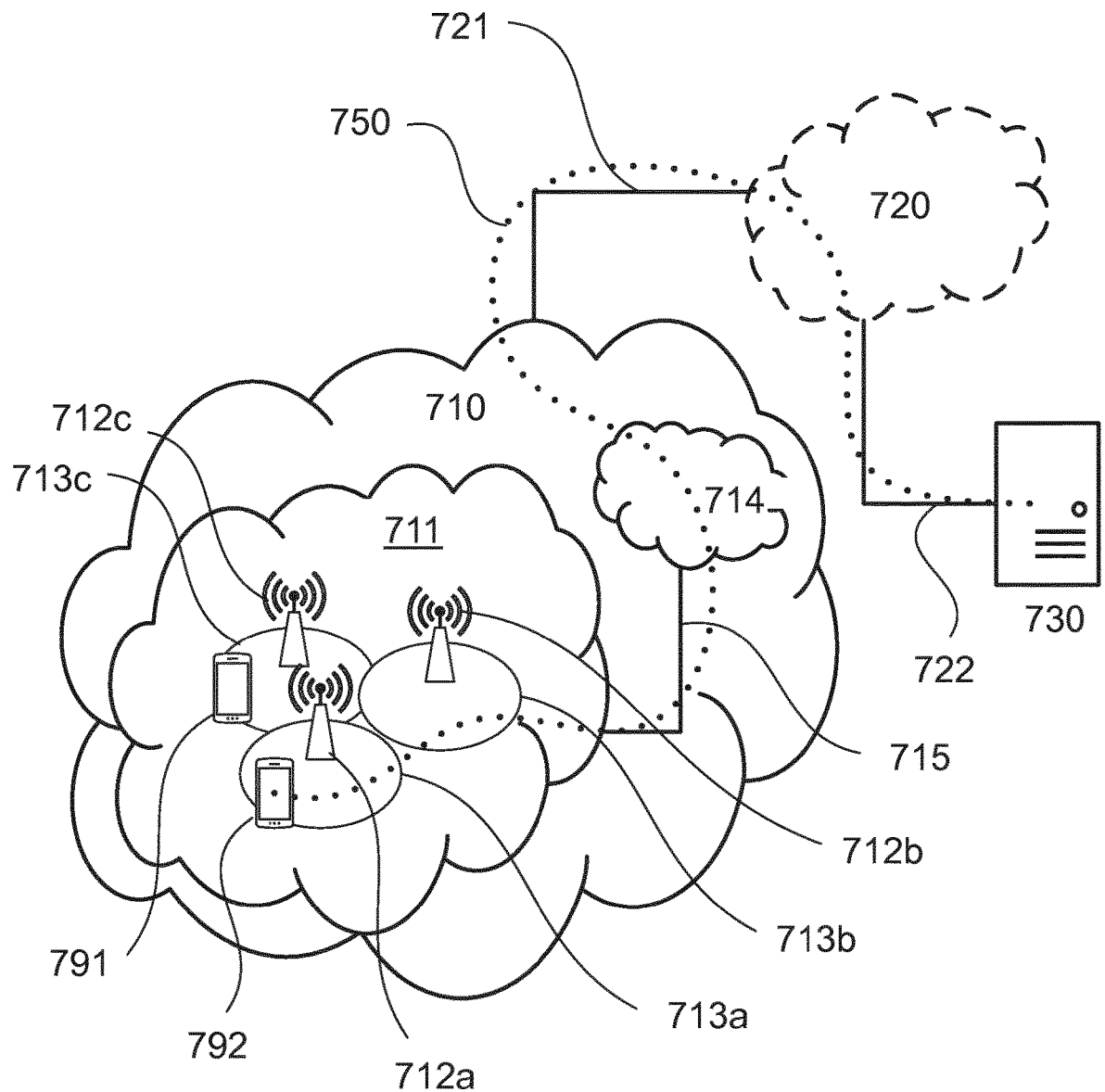
FIG. 13 illustrates a telecommunication network connected via an intermediate network to a host computer, according to certain embodiments.

FIG. 13 illustrates a telecommunication network connected via an intermediate network to a host computer, in accordance with some embodiments. With reference to FIG. 13, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 13 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 14:
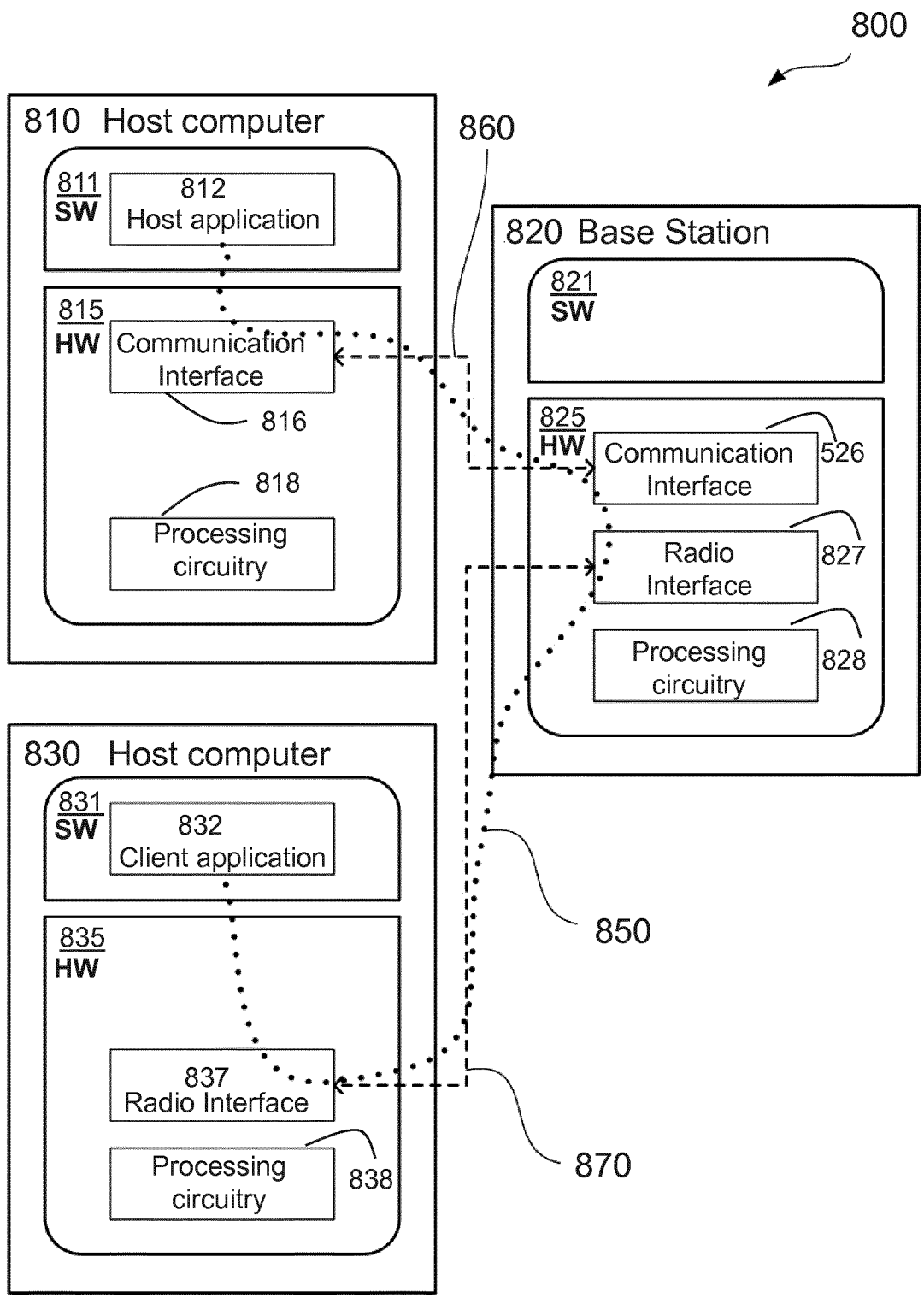
FIG. 14 illustrates a generalized block diagram of a host computer communicating via a base station with a user equipment over a partially wireless connection, according to certain embodiments.

FIG. 14 shows a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 14. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 14) served by base station 820. Communication interface 826 may be configured to facilitate connection 860 to host computer 810. Connection 860 may be direct or it may pass through a core network (not shown in FIG. 14) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 14 may be similar or identical to host computer 730, one of base stations 712a, 712b, 712c and one of UEs 791, 792 of FIG. 13, respectively. This is to say, the inner workings of these entities may be as shown in FIG. 14 and independently, the surrounding network topology may be that of FIG. 13.

In FIG. 14, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figures 15, 16:
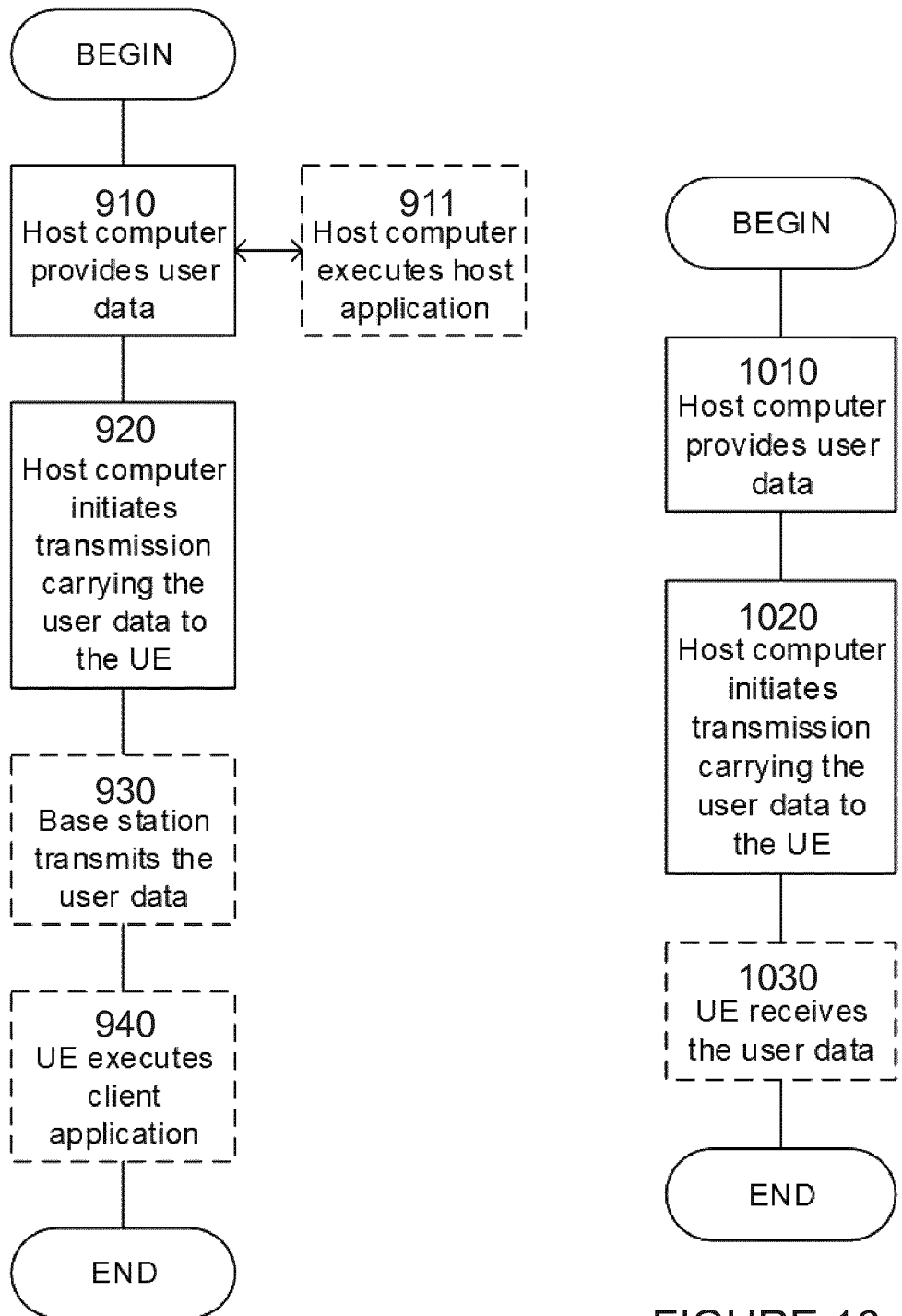
FIG. 15 illustrates a method implemented in a communication system, according to one embodiment.
FIG. 16 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figures 17, 18:
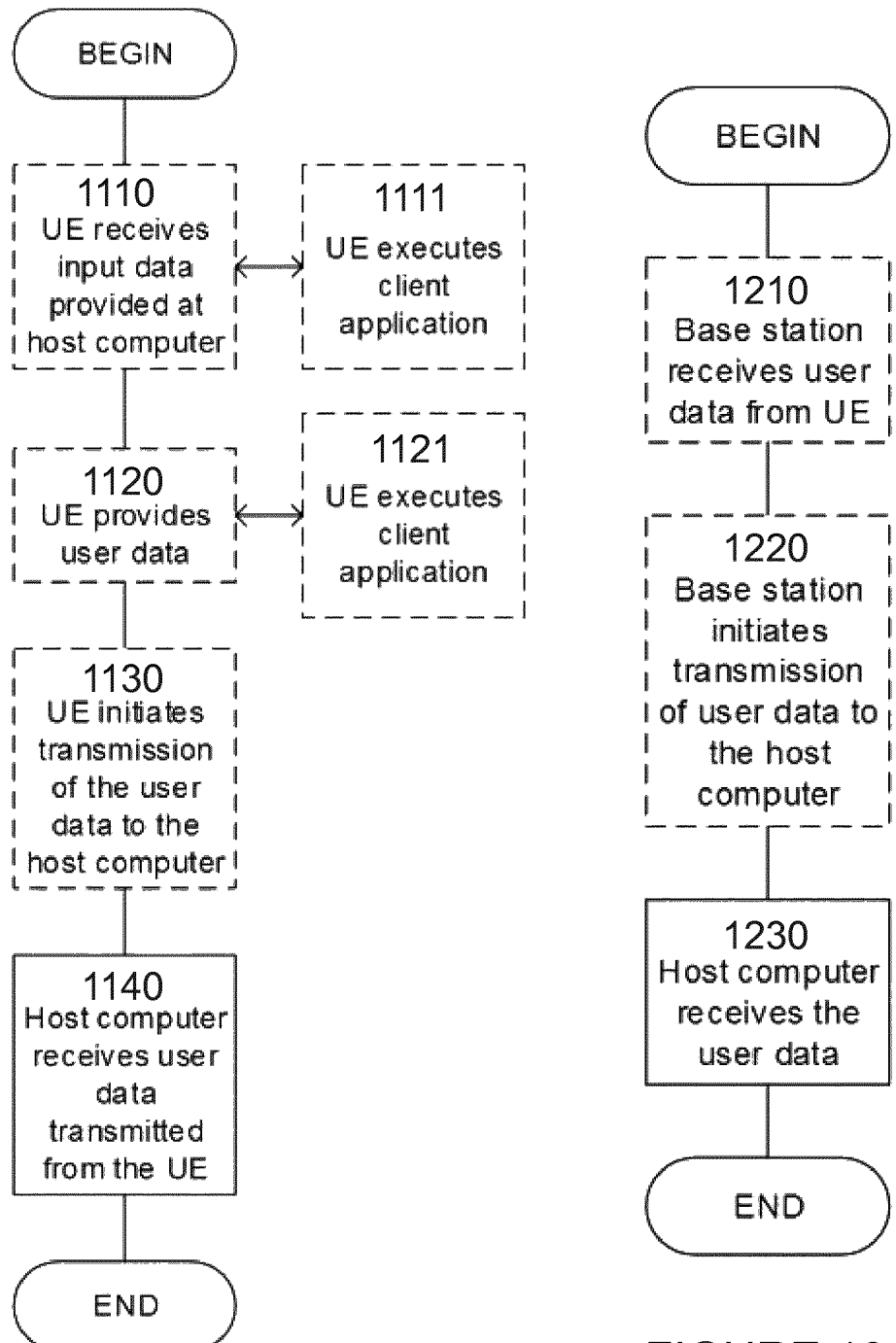
FIG. 17 illustrates another method implemented in a communication system, according to one embodiment.
FIG. 18 illustrates another method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 19:
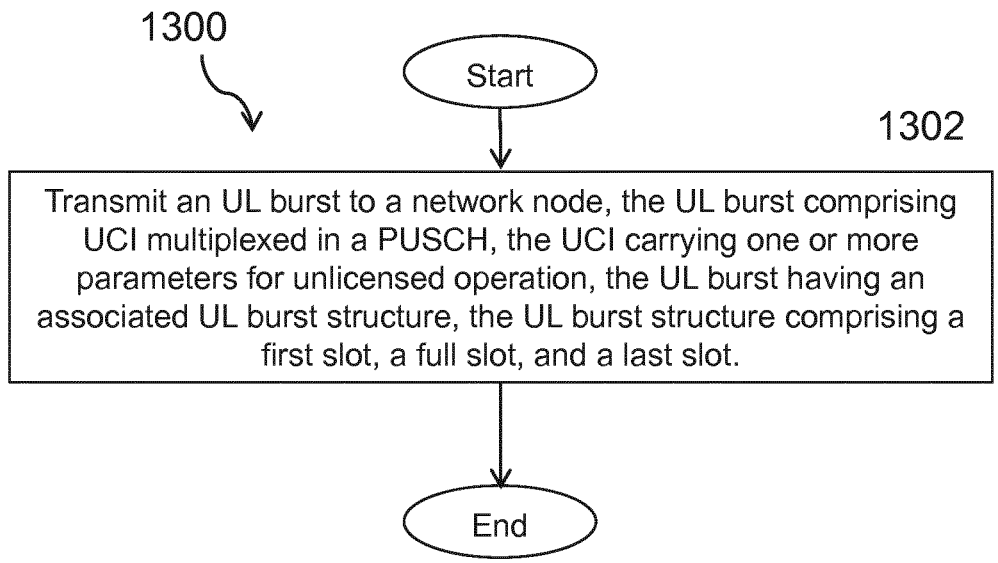
FIG. 19 illustrates an example method by a wireless device, according to certain embodiments.

FIG. 19 depicts a method 1300 in a wireless device, in accordance with particular embodiments. The method begins at step 1302, where the wireless device transmits an UL burst to a network node, the UL burst comprising UCI multiplexed in a PUSCH, the UCI carrying one or more parameters for unlicensed operation, the UL burst having an associated UL burst structure, the UL burst structure comprising a first slot, a full slot, and a last slot.

In a particular embodiment, the first slot and/or the last slot is the full slot.

In certain embodiments, the method may comprise determining the UCI for the UL burst. In certain embodiments, the method may comprise configuring the UL burst to be transmitted to the network node.

In certain embodiments, the first slot may comprise one or more mini slots and type B scheduling may be used for PUSCH transmission within the first slot.

In certain embodiments, PUSCH transmission may occupy the full slot. In certain embodiments, Type A scheduling may be used for the full slot (see for example 3GPP TS 38.214 V15.2.0, clause 5.1.2). In certain other embodiments, Type B scheduling may be used for the full slot.

In certain embodiments, PUSCH transmission may occupy less than all of the last slot.

In certain embodiments, the method may comprise receiving a configuration for one or more ending positions that apply to the last slot of the UL burst.

In certain embodiments, each of the first slot, the full slot, and the last slot may comprise one or more demodulation reference signals. In certain embodiments, the first slot may comprise one or more mini-slots, and each mini-slot of the first slot comprises a single demodulation reference signal. The full slot may comprise one or more slots, and each slot of the full slot comprises a single demodulation reference signal. The last slot may comprise a single demodulation reference signal. In certain embodiments, each of the first slot, the full slot, and the last slot may comprise an associated pattern of one or more demodulation reference signals.

In certain embodiments, each associated pattern of one or more demodulation reference signals may be indicative of a slot type, the slot type comprising one of the first slot, the full slot, and the last slot. In certain embodiments, the pattern of one or more demodulation reference signals associated with the first slot may indicate that the slot type is a first slot, the pattern of one or more demodulation reference signals associated with the full slot may indicate that the slot type is a full slot, and the pattern of one or more demodulation reference signals associated with the last slot may indicate that the slot type is a last slot. In certain embodiments, the slot type may be indicative of an associated mapping for a location of the UCI. In a particular embodiment, the pattern for the one or more demodulation reference signals may be indicative of an associated mapping for a location of UCI.

In certain embodiments, each pattern of one or more demodulation reference signals associated with each of the first slot, the full slot, and the last slot may be the same. In certain embodiments, a coded bit length of the UCI may be independent of a length of the PUSCH. In certain embodiments, a coded bit length of the UCI may assume a predefined value for a PUSCH length. In certain embodiments, the UCI may indicate one or more of: a first symbol of a corresponding PUSCH; an index to a predefined set of possible starting symbols of the corresponding PUSCH; a last symbol of the corresponding PUSCH; an index to a predefined set of possible last symbols of the corresponding PUSCH; and a length of the corresponding PUSCH. In certain embodiments, the first slot may comprise one or more mini-slots, and each mini-slot may comprise associated UCI.

In certain embodiments, the pattern of one or more demodulation reference signals associated with the first slot may comprise a first pattern, and one or more of the pattern of one or more demodulation reference signals associated with the full slot and the pattern of demodulation reference signals associated with the last slot may comprise a subset of demodulation reference signals included in the first pattern. In certain embodiments, the UCI may indicate a length of the PUSCH. In certain embodiments, the UCI may indicate a last symbol of the PUSCH. In certain embodiments, a coded bit length of the UCI may be independent of a length of the PUSCH. In certain embodiments, a coded bit length of the UCI may assume a predefined value for a PUSCH length.

In certain embodiments, the UCI may include an indication of where the PUSCH ends. In certain embodiments, the indication of where the PUSCH ends may comprise at least one of: a length of the PUSCH; a symbol index where the PUSCH ends; and an index to a predefined set of possible ending points. In certain embodiments, the UCI may include an index of a code block group (CBG). In certain embodiments, the UCI may include a bitmap, wherein each bit of the bitmap corresponds to a CBG. In certain embodiments, the one or more parameters may comprise one or more of: a listen-before-talk (LBT) indication; a gap indication; a length of an upcoming downlink part in a shared channel occupancy time; and a channel occupancy time sharing indication.

In a particular embodiment, the first slot includes one or more mini-slots and each PUSCH transmission has an associated UCI.

Figure 20:
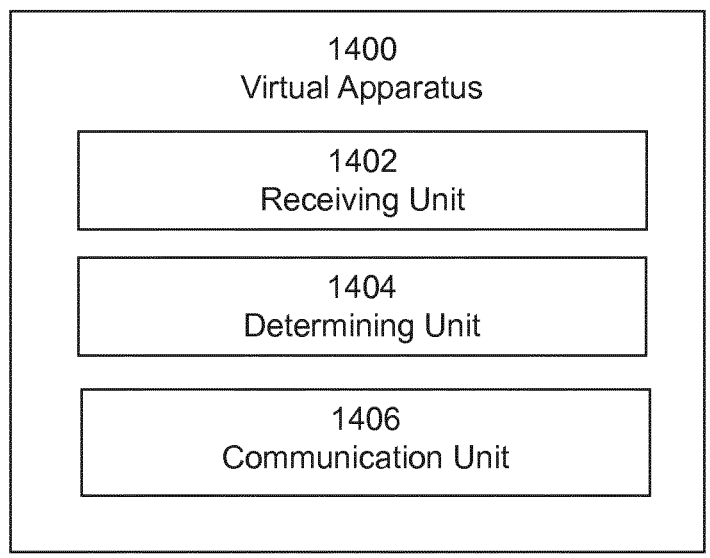
FIG. 20 illustrates an exemplary virtual computing device, according to certain embodiments.

FIG. 20 illustrates a schematic block diagram of an apparatus 1400 in a wireless network (for example, the wireless network shown in FIG. 8). The apparatus may be implemented in a wireless device (e.g., wireless device 410 shown in FIG. 8). Apparatus 1400 is operable to carry out the example method described with reference to FIG. 19 and possibly any other processes or methods disclosed herein. It is also to be understood that the method of FIG. 19 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1402, determining unit 1404, communication unit 1406, and any other suitable units of apparatus 1400 to perform corresponding functions according one or more embodiments of the present disclosure.

In certain embodiments, apparatus 1400 may be a UE. As illustrated in FIG. 20, apparatus 1400 includes receiving unit 1402, determining unit 1404, and communication unit 1406.

Receiving unit 1402 may be configured to perform the receiving functions of apparatus 1400. For example, receiving unit 1402 may be configured to receive a configuration for one or more ending positions that apply to the last slot of the UL burst.

Receiving unit 1402 may receive any suitable information (e.g., from a wireless device or another network node). Receiving unit 1402 may include a receiver and/or a transceiver, such as RF transceiver circuitry 422 described above in relation to FIG. 8. Receiving unit 1402 may include circuitry configured to receive messages and/or signals (wireless or wired). In particular embodiments, receiving unit 1402 may communicate received messages and/or signals to determining unit 1404 and/or any other suitable unit of apparatus 1400. The functions of receiving unit 1402 may, in certain embodiments, be performed in one or more distinct units.

Determining unit 1404 may perform the processing functions of apparatus 1400. For example, determining unit 1404 may be configured to determine the UCI for the UL burst. As another example, determining unit 1404 may be configured to configure the UL burst to be transmitted to the network node. Determining unit 1404 may include or be included in one or more processors, such as processing circuitry 420 described above in relation to FIG. 8. Determining unit 1404 may include analog and/or digital circuitry configured to perform any of the functions of determining unit 1404 and/or processing circuitry 420 described above. The functions of determining unit 1404 may, in certain embodiments, be performed in one or more distinct units.

Communication unit 1406 may be configured to perform the transmission functions of apparatus 1400. For example, communication unit 1406 may be configured to transmit an UL burst to a network node, the UL burst comprising UCI multiplexed in a PUSCH, the UCI carrying one or more parameters for unlicensed operation, the UL burst having an associated UL burst structure, the UL burst structure comprising a first slot, a full slot, and a last slot.

Communication unit 1406 may transmit messages (e.g., to a wireless device and/or another network node). Communication unit 1406 may include a transmitter and/or a transceiver, such as RF transceiver circuitry 422 described above in relation to FIG. 8. Communication unit 1406 may include circuitry configured to transmit messages and/or signals (e.g., through wireless or wired means). In particular embodiments, communication unit 1406 may receive messages and/or signals for transmission from determining unit 1404 or any other unit of apparatus 1400. The functions of communication unit 1404 may, in certain embodiments, be performed in one or more distinct units.

Figure 21:
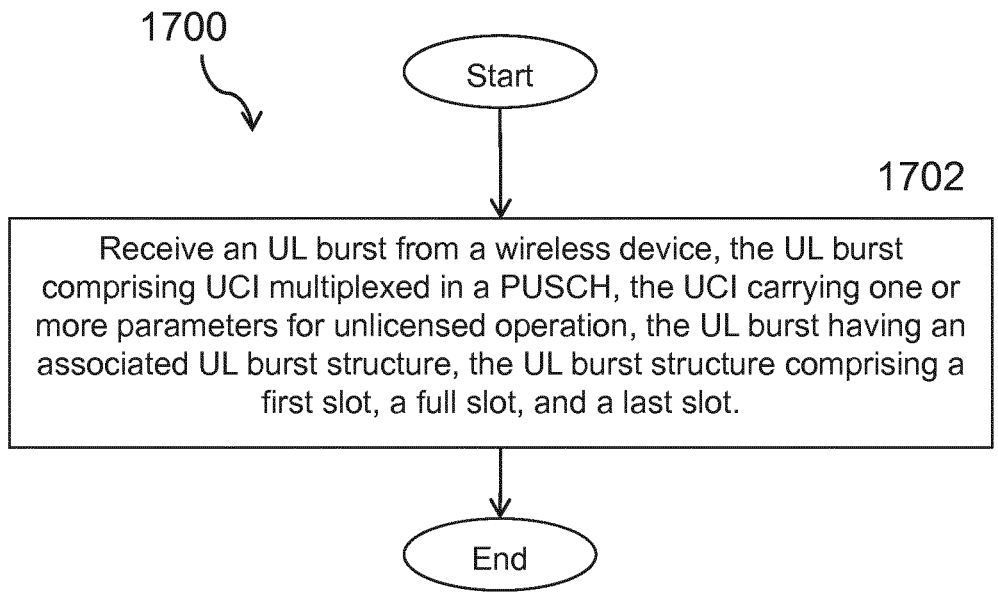
FIG. 21 illustrates an example method by a network node, according to certain embodiments.

FIG. 21 depicts a method 1700 in a network node, in accordance with particular embodiments. The method begins at step 1702, where the network node receives an UL burst from a wireless device, the UL burst comprising UCI multiplexed in a PUSCH, the UCI carrying one or more parameters for unlicensed operation, the UL burst having an associated UL burst structure, the UL burst structure comprising a first slot, a full slot, and a last slot.

In certain embodiments, the first slot may comprise one or more mini slots.

In certain embodiments, the first slot and/or the last slot is the full slot.

In certain embodiments, Type B scheduling may be used for PUSCH transmission within the first slot.

In certain embodiments, PUSCH transmission may occupy the full slot. In certain embodiments, Type A scheduling may be used for the full slot (see for example 3GPP TS 38.214 V15.2.0, clause 5.1.2). In certain embodiments, Type B scheduling may be used for the full slot. In certain embodiments, PUSCH transmission may occupy less than all of the last slot.

In certain embodiments, the method may comprise transmitting a configuration for one or more ending positions that apply to the last slot of the UL burst.

In certain embodiments, each of the first slot, the full slot, and the last slot may comprise one or more demodulation reference signals. In certain embodiments, the first slot may comprise one or more mini-slots, and each mini-slot of the first slot may comprise a single demodulation reference signal. The full slot may comprise one or more slots, and each slot of the full slot may comprise a single demodulation reference signal. The last slot may comprise a single demodulation reference signal. In certain embodiments, the method may comprise determining a starting point of each slot and mini-slot based on detection of the demodulation reference signal in each respective slot and mini-slot.

In certain embodiments, each of the first slot, the full slot, and the last slot may comprise an associated pattern of one or more demodulation reference signals.

In certain embodiments, each associated pattern of one or more demodulation reference signals may be indicative of a slot type, the slot type may comprise one of the first slot, the full slot, and the last slot. In certain embodiments, the pattern of one or more demodulation reference signals associated with the first slot may indicate that the slot type is a first slot, the pattern of one or more demodulation reference signals associated with the full slot may indicate that the slot type is a full slot, and the pattern of one or more demodulation reference signals associated with the last slot may indicate that the slot type is a last slot. In certain embodiments, the method may comprise detecting the pattern of one or more demodulation reference signals in each of the first slot, the full slot, and the last slot, and determining the slot type based on the detected pattern of one or more demodulation reference signals in each of the first slot, the full slot, and the last slot. In certain embodiments, the slot type may be indicative of an associated mapping for a location of the UCI. In certain embodiments, the pattern for the one or more demodulation reference signals may be indicative of an associated mapping for a location of the UCI. In certain embodiments, the method may further comprise mapping the UCI to the PUSCH. In a particular embodiment, the mapping of the UCI to the PUSCH may be based on the detected slot type.

In certain embodiments, each pattern of one or more demodulation reference signals associated with each of the first slot, the full slot, and the last slot may be the same. In certain embodiments, the method may further comprise mapping the UCI to the PUSCH based on a position of a first DMRS symbol in the pattern of one or more demodulation reference signals. In certain embodiments, a coded bit length of the UCI may be independent of a length of the PUSCH. In certain embodiments, a coded bit length of the UCI may assume a predefined value for a PUSCH length. In certain embodiments, the UCI may indicate one or more of: a first symbol of a corresponding PUSCH; an index to a predefined set of possible starting symbols of the corresponding PUSCH; a last symbol of the corresponding PUSCH; an index to a predefined set of possible last symbols of the corresponding PUSCH; and a length of the corresponding PUSCH. In certain embodiments, the first slot may comprise one or more mini-slots, and each mini-slot may comprise associated UCI. In certain embodiments, the method may comprise detecting one or more demodulation reference signals in the one or more mini-slots of the first slot in sequential order, decoding a first UCI of the first mini slot of the one or more mini-slots of the first slot, and determining a start and end of the first mini-slot based on the decoded first UCI. In certain embodiments, the method may comprise performing blind detection for UCI presence in a next symbol after each demodulation reference signal symbol in each mini-slot.

In certain embodiments, the pattern of one or more demodulation reference signals associated with the first slot may comprise a first pattern comprising more than one demodulation reference signal, and one or more of the pattern of one or more demodulation reference signals associated with the full slot and the pattern of one or more demodulation reference signals associated with the last slot may comprise a subset of demodulation reference signals included in the first pattern. In certain embodiments, the method may further comprise: detecting demodulation reference signals in the first pattern, the pattern of one or more demodulation reference signals associated with the full slot, and the pattern of one or more demodulation reference signals associated with the last slot; determining a number of demodulation reference signals in the first pattern, the pattern of one or more demodulation reference signals associated with the full slot, and the pattern of one or more demodulation reference signals associated with the last slot; and determining that the first pattern is associated with the first slot type based on the first pattern comprising a larger number of demodulation reference signals than the pattern of one or more demodulation reference signals associated with the full slot and the pattern of one or more demodulation reference signals associated with the last slot. In certain embodiments, the UCI may indicate a length of the PUSCH. In certain embodiments, the UCI may indicate a last symbol of the PUSCH. In certain embodiments, a coded bit length of the UCI may be independent of a length of the PUSCH. In certain embodiments, a coded bit length of the UCI assumes a predefined value for a PUSCH length. In certain embodiments, each PUSCH transmission has an associated UCI.

In certain embodiments, the UCI may include an indication of where the PUSCH ends. In certain embodiments, the indication of where the PUSCH ends comprises at least one of: a length of the PUSCH; a symbol index where the PUSCH ends; and an index to a predefined set of possible ending points. In certain embodiments, the UCI may include an index of a CBG. In certain embodiments, the UCI may include a bitmap, wherein each bit of the bitmap corresponds to a CBG. In certain embodiments, the one or more parameters may comprise one or more of: a LBT indication; a gap indication; a length of an upcoming DL part in a shared channel occupancy time; and a channel occupancy time sharing indication.

Figure 22:
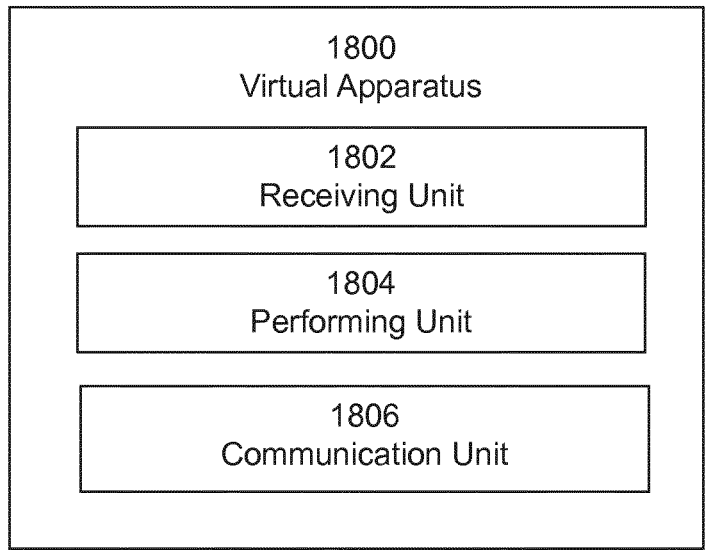
FIG. 22 illustrates another exemplary virtual computing device, according to certain embodiments.

FIG. 22 illustrates a schematic block diagram of an apparatus 1800 in a wireless network (for example, the wireless network shown in FIG. 8). The apparatus may be implemented in a network node (e.g., network node 460 shown in FIG. 8). Apparatus 1800 is operable to carry out the example method described with reference to FIG. 21 and possibly any other processes or methods disclosed herein. It is also to be understood that the method of FIG. 21 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802, determining unit 1804, communication unit 1806, and any other suitable units of apparatus 1800 to perform corresponding functions according one or more embodiments of the present disclosure.

In certain embodiments, apparatus 1800 may be an eNB or a gNB. As illustrated in FIG. 22, apparatus 1800 includes receiving unit 1802, determining unit 1804, and communication unit 1806. Receiving unit 1802 may be configured to perform the receiving functions of apparatus 1800. For example, receiving unit 1802 may be configured to receive an UL burst from a wireless device, the UL burst comprising UCI multiplexed in a PUSCH, the UCI carrying one or more parameters for unlicensed operation, the UL burst having an associated UL burst structure, the UL burst structure comprising a first slot, a full slot, and a last slot.

Receiving unit 1802 may receive any suitable information (e.g., from a wireless device or another network node). Receiving unit 1802 may include a receiver and/or a transceiver, such as RF transceiver circuitry 472 described above in relation to FIG. 8. Receiving unit 1802 may include circuitry configured to receive messages and/or signals (wireless or wired). In particular embodiments, receiving unit 1802 may communicate received messages and/or signals to determining unit 1804 and/or any other suitable unit of apparatus 1800. The functions of receiving unit 1802 may, in certain embodiments, be performed in one or more distinct units.

Determining unit 1804 may perform the processing functions of apparatus 1800. For example, determining unit 1804 may be configured to determine a starting point of each slot and mini-slot based on detection of the demodulation reference signal in each respective slot and mini-slot. As another example, determining unit 1804 may be configured to detect the pattern of one or more demodulation reference signals in each of the first slot, the full slot, and the last slot and determine the slot type based on the detected pattern of one or more demodulation reference signals in each of the first slot, the full slot, and the last slot. As still another example, determining unit 1804 may be configured to map the UCI to the PUSCH based on the detected slot type. As yet another example, determining unit 1804 may be configured to map the UCI to the PUSCH based on a position of a first DMRS symbol in the pattern of one or more demodulation reference signals. As another example, determining unit 1804 may be configured to detect one or more demodulation reference signals in the one or more mini-slots of the first slot in sequential order, decoding a first UCI of the first mini slot of the one or more mini-slots of the first slot, and determine a start and end of the first mini-slot based on the decoded first UCI. As another example, determining unit 1804 may be configured to perform blind detection for UCI presence in a next symbol after each demodulation reference signal symbol in each mini-slot. As another example, determining unit 1804 may be configured to: detect demodulation reference signals in the first pattern, the pattern of one or more demodulation reference signals associated with the full slot, and the pattern of one or more demodulation reference signals associated with the last slot; determine a number of demodulation reference signals in the first pattern, the pattern of one or more demodulation reference signals associated with the full slot, and the pattern of one or more demodulation reference signals associated with the last slot; and determine that the first pattern is associated with the first slot type based on the first pattern comprising a larger number of demodulation reference signals than the pattern of one or more demodulation reference signals associated with the full slot and the pattern of one or more demodulation reference signals associated with the last slot.

Determining unit 1804 may include or be included in one or more processors, such as processing circuitry 470 described above in relation to FIG. 8. Determining unit 1804 may include analog and/or digital circuitry configured to perform any of the functions of determining unit 1804 and/or processing circuitry 470 described above. The functions of determining unit 1804 may, in certain embodiments, be performed in one or more distinct units.

Communication unit 1806 may be configured to perform the transmission functions of apparatus 1800. For example, communication unit 1806 may be configured to transmit a configuration for one or more ending positions that apply to the last slot of the UL burst.

Communication unit 1806 may transmit messages (e.g., to a wireless device and/or another network node). Communication unit 1806 may include a transmitter and/or a transceiver, such as RF transceiver circuitry 472 described above in relation to FIG. 8. Communication unit 1806 may include circuitry configured to transmit messages and/or signals (e.g., through wireless or wired means). In particular embodiments, communication unit 1806 may receive messages and/or signals for transmission from determining unit 1804 or any other unit of apparatus 1800. The functions of communication unit 1804 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

EXAMPLES

Group A

Example 1. A method performed by a wireless device, the method comprising: transmitting an uplink (UL) burst to a network node, the UL burst comprising UL control information (UCI) multiplexed in a Physical Uplink Shared Channel (PUSCH), the UCI carrying one or more parameters for unlicensed operation, the UL burst having an associated UL burst structure, the UL burst structure comprising a first slot, a full slot, and a last slot.

Example 2. The method of Example 1, wherein the first slot comprises one or more mini slots.

Example 3. The method of any of Examples 1-2, wherein Type B scheduling is used for PUSCH transmission within the first slot.

Example 4. The method of any of Examples 1-3, wherein PUSCH transmission occupies the full slot.

Example 5. The method of any of Examples 1-4, wherein Type A scheduling is used for the full slot.

Example 6. The method of any of Examples 1-4, wherein Type B scheduling is used for the full slot.

Example 7. The method of any of Examples 1-6, wherein PUSCH transmission occupies less than all of the last slot.

Example 8. The method of any of Examples 1-7, comprising receiving a configuration for one or more ending positions that apply to the last slot of the UL burst.

Example 9. The method of any of Examples 1-8, wherein each of the first slot, the full slot, and the last slot comprise one or more demodulation reference signals.

Example 10. The method of Example 9, wherein: the first slot comprises one or more mini-slots, and each mini-slot of the first slot comprises a single demodulation reference signal; the full slot comprises one or more slots, and each slot of the full slot comprises a single demodulation reference signal; and the last slot comprises a single demodulation reference signal.

Example 11. The method of any of Examples 1-9, wherein each of the first slot, the full slot, and the last slot comprise an associated pattern of one or more demodulation reference signals.

Example 12. The method of Example 11, wherein each associated pattern of one or more demodulation reference signals is indicative of a slot type, the slot type comprising one of the first slot, the full slot, and the last slot.

Example 13. The method of Example 11, wherein: the pattern of one or more demodulation reference signals associated with the first slot indicates that the slot type is a first slot; the pattern of one or more demodulation reference signals associated with the full slot indicates that the slot type is a full slot; and the pattern of one or more demodulation reference signals associated with the last slot indicates that the slot type is a last slot.

Example 14. The method of any of Examples 12-13, wherein the slot type is indicative of an associated mapping for a location of the UCI.

Example 15. The method of Example 11, wherein each pattern of one or more demodulation reference signals associated with each of the first slot, the full slot, and the last slot is the same.

Example 16. The method of Example 15, wherein a coded bit length of the UCI is independent of a length of the PUSCH.

Example 17. The method of Example 15, wherein a coded bit length of the UCI assumes a predefined value for a PUSCH length.

Example 18. The method of any of Examples 13-17, wherein the UCI indicates one or more of: a first symbol of a corresponding PUSCH; an index to a predefined set of possible starting symbols of the corresponding PUSCH; a last symbol of the corresponding PUSCH; an index to a predefined set of possible last symbols of the corresponding PUSCH; and a length of the corresponding PUSCH.

Example 19. The method of any of Examples 13-18, wherein: the first slot comprises one or more mini-slots; and each mini-slot comprises associated UCI.

Example 20. The method of Example 11, wherein: the pattern of one or more demodulation reference signals associated with the first slot comprises a first pattern; and one or more of the pattern of one or more demodulation reference signals associated with the full slot and the pattern of demodulation reference signals associated with the last slot comprises a subset of demodulation reference signals included in the first pattern.

Example 21. The method of Example 20, wherein the UCI indicates a length of the PUSCH.

Example 22. The method of Example 20, wherein the UCI indicates a last symbol of the PUSCH.

Example 23. The method of any of Examples 20-22, wherein a coded bit length of the UCI is independent of a length of the PUSCH.

Example 24. The method of Example 20-22, wherein a coded bit length of the UCI assumes a predefined value for a PUSCH length.

Example 25. The method of any of Examples 1-24, wherein the UCI includes an indication of where the PUSCH ends.

Example 26. The method of Example 25, wherein the indication of where the PUSCH ends comprises at least one of: a length of the PUSCH; a symbol index where the PUSCH ends; and an index to a predefined set of possible ending points.

Example 27. The method of any of Examples 1-26, wherein the UCI includes an index of a code block group (CBG).

Example 28. The method of any of Examples 1-26, wherein the UCI includes a bitmap, wherein each bit of the bitmap corresponds to a CBG.

Example 29. The method of any of Examples 1-28, wherein the one or more parameters comprise one or more of: a listen-before-talk (LBT) indication; a gap indication; a length of an upcoming downlink part in a shared channel occupancy time; and a channel occupancy time sharing indication.

Example 30. The method of any of Examples 1-29, further comprising: determining the UCI for the UL burst.

Example 31. The method of any of Examples 1-30, further comprising: configuring the UL burst to be transmitted to the network node.

Group B Examples

Example 32. A method performed by a base station, the method comprising:
  receiving an uplink (UL) burst from a wireless device, the UL burst comprising UL control information (UCI) multiplexed in a Physical Uplink Shared Channel (PUSCH), the UCI carrying one or more parameters for unlicensed operation, the UL burst having an associated UL burst structure, the UL burst structure comprising a first slot, a full slot, and a last slot.

Example 33. The method of Example 32, wherein the first slot comprises one or more mini slots.

Example 34. The method of any of Examples 32-33, wherein Type B scheduling is used for Physical Uplink Shared Channel (PUSCH) transmission within the first slot.

Example 35. The method of any of Examples 32-34, wherein PUSCH transmission occupies the full slot.

Example 36. The method of any of Examples 32-35, wherein Type A scheduling is used for the full slot.

Example 37. The method of any of Examples 32-35, wherein Type B scheduling is used for the full slot.

Example 38. The method of any of Examples 32-37, wherein PUSCH transmission occupies less than all of the last slot.

Example 39. The method of any of Examples 32-38, comprising transmitting a configuration for one or more ending positions that apply to the last slot of the UL burst.

Example 40. The method of any of Examples 32-39, wherein each of the first slot, the full slot, and the last slot comprise one or more demodulation reference signals.

Example 41. The method of Example 40, wherein: the first slot comprises one or more mini-slots, and each mini-slot of the first slot comprises a single demodulation reference signal; the full slot comprises one or more slots, and each slot of the full slot comprises a single demodulation reference signal; and the last slot comprises a single demodulation reference signal.

Example 42. The method of Example 41, further comprising: determining a starting point of each slot and mini-slot based on detection of the demodulation reference signal in each respective slot and mini-slot.

Example 43. The method of any of Examples 32-39, wherein each of the first slot, the full slot, and the last slot comprise an associated pattern of one or more demodulation reference signals.

Example 44. The method of Example 43, wherein each associated pattern of one or more demodulation reference signals is indicative of a slot type, the slot type comprising one of the first slot, the full slot, and the last slot. Example 45. The method of Example 44, wherein: the pattern of one or more demodulation reference signals associated with the first slot indicates that the slot type is a first slot; the pattern of one or more demodulation reference signals associated with the full slot indicates that the slot type is a full slot; and the pattern of one or more demodulation reference signals associated with the last slot indicates that the slot type is a last slot.

Example 46. The method of any of Example 44-45, further comprising: detecting the pattern of one or more demodulation reference signals in each of the first slot, the full slot, and the last slot; and determining the slot type based on the detected pattern of one or more demodulation reference signals in each of the first slot, the full slot, and the last slot.

Example 47. The method of any of Examples 44-46, wherein the slot type is indicative of an associated mapping for a location of the UCI.

Example 48. The method of Example 47, further comprising: mapping the UCI to the PUSCH based on the detected slot type.

Example 49. The method of Example 43, wherein each pattern of one or more demodulation reference signals associated with each of the first slot, the full slot, and the last slot is the same.

Example 50. The method of Example 49, further comprising mapping the UCI to the PUSCH based on a position of a first DMRS symbol in the pattern of one or more demodulation reference signals.

Example 52. The method of any of Examples 49-50, wherein a coded bit length of the UCI is independent of a length of the PUSCH.

Example 53. The method of any of Example 49-50, wherein a coded bit length of the UCI assumes a predefined value for a PUSCH length.

Example 54. The method of any of Examples 49-52, wherein the UCI indicates one or more of: a first symbol of a corresponding PUSCH; an index to a predefined set of possible starting symbols of the corresponding PUSCH; a last symbol of the corresponding PUSCH; an index to a predefined set of possible last symbols of the corresponding PUSCH; and a length of the corresponding PUSCH.

Example 55. The method of any of Examples 49-53, wherein: the first slot comprises one or more mini-slots; and each mini-slot comprises associated UCI.

Example 56. The method of Example 54, further comprising: detecting one or more demodulation reference signals in the one or more mini-slots of the first slot in sequential order; decoding a first UCI of the first mini slot of the one or more mini-slots of the first slot; and determining a start and end of the first mini-slot based on the decoded first UCI.

Example 57. The method of Example 54, further comprising: performing blind detection for UCI presence in a next symbol after each demodulation reference signal symbol in each mini-slot.

Example 58. The method of Example 44, wherein: the pattern of one or more demodulation reference signals associated with the first slot comprises a first pattern comprising more than one demodulation reference signal; and one or more of the pattern of one or more demodulation reference signals associated with the full slot and the pattern of one or more demodulation reference signals associated with the last slot comprises a subset of demodulation reference signals included in the first pattern.

Example 59. The method of Example 57, further comprising: detecting demodulation reference signals in the first pattern, the pattern of one or more demodulation reference signals associated with the full slot, and the pattern of one or more demodulation reference signals associated with the last slot; determining a number of demodulation reference signals in the first pattern, the pattern of one or more demodulation reference signals associated with the full slot, and the pattern of one or more demodulation reference signals associated with the last slot; and determining that the first pattern is associated with the first slot type based on the first pattern comprising a larger number of demodulation reference signals than the pattern of one or more demodulation reference signals associated with the full slot and the pattern of one or more demodulation reference signals associated with the last slot.

Example 60. The method of any of Examples 57-58, wherein the UCI indicates a length of the PUSCH.

Example 61. The method of any of Examples 57-58, wherein the UCI indicates a last symbol of the PUSCH.

Example 62. The method of any of Examples 57-60, wherein a coded bit length of the UCI is independent of a length of the PUSCH.

Example 64. The method of any of Examples 57-60, wherein a coded bit length of the UCI assumes a predefined value for a PUSCH length.

Example 65. The method of any of Examples 32-62, wherein the UCI includes an indication of where the PUSCH ends.

Example 66. The method of Example 63, wherein the indication of where the PUSCH ends comprises at least one of: a length of the PUSCH; a symbol index where the PUSCH ends; and an index to a predefined set of possible ending points.

Example 67. The method of any of Examples 32-64, wherein the UCI includes an index of a code block group (CBG).

Example 68. The method of any of Examples 32-64, wherein the UCI includes a bitmap, wherein each bit of the bitmap corresponds to a CBG.

Example 69. The method of any of Examples 32-66, wherein the UCI includes one or more parameters, the one or more parameters comprising one or more of: a listen-before-talk (LBT) indication; a gap indication; a length of an upcoming downlink part in a shared channel occupancy time; and a channel occupancy time sharing indication.

Group C Examples

Example 70. A wireless device configured to: transmit an uplink (UL) burst to a network node, the UL burst comprising UL control information (UCI) multiplexed in a Physical Uplink Shared Channel (PUSCH), the UCI carrying one or more parameters for unlicensed operation, the UL burst having an associated UL burst structure, the UL burst structure comprising a first slot, a full slot, and a last slot.

Example 71. The wireless device of Example 68, wherein the first slot comprises one or more mini slots.

Example 72. The wireless device of any of Examples 68-69, wherein Type B scheduling is used for PUSCH transmission within the first slot.

Example 73. The wireless device of any of Examples 68-70, wherein PUSCH transmission occupies the full slot.

Example 74. The wireless device of any of Examples 68-71, wherein Type A scheduling is used for the full slot.

Example 75. The wireless device of any of Examples 68-71, wherein Type B scheduling is used for the full slot.

Example 76. The wireless device of any of Examples 68-73, wherein PUSCH transmission occupies less than all of the last slot.

Example 77. The wireless device of any of Examples 68-74, further configured to receive a configuration for one or more ending positions that apply to the last slot of the UL burst.

Example 78. The wireless device of any of Examples 68-75, wherein each of the first slot, the full slot, and the last slot comprise one or more demodulation reference signals.

Example 79. The wireless device of Example 76, wherein: the first slot comprises one or more mini-slots, and each mini-slot of the first slot comprises a single demodulation reference signal; the full slot comprises one or more slots, and each slot of the full slot comprises a single demodulation reference signal; and the last slot comprises a single demodulation reference signal.

Example 80. The wireless device of any of Examples 68-76, wherein each of the first slot, the full slot, and the last slot comprise an associated pattern of one or more demodulation reference signals.

Example 81. The wireless device of Example 78, wherein each associated pattern of one or more demodulation reference signals is indicative of a slot type, the slot type comprising one of the first slot, the full slot, and the last slot.

Example 82. The wireless device of Example 78, wherein: the pattern of one or more demodulation reference signals associated with the first slot indicates that the slot type is a first slot; the pattern of one or more demodulation reference signals associated with the full slot indicates that the slot type is a full slot; and the pattern of one or more demodulation reference signals associated with the last slot indicates that the slot type is a last slot.

Example 83. The wireless device of any of Examples 79-80, wherein the slot type is indicative of an associated mapping for a location of the UCI.

Example 84. The wireless device of Example 78, wherein each pattern of one or more demodulation reference signals associated with each of the first slot, the full slot, and the last slot is the same.

Example 85. The wireless device of Example 82, wherein a coded bit length of the UCI is independent of a length of the PUSCH.

Example 86. The wireless device of Example 82, wherein a coded bit length of the UCI assumes a predefined value for a PUSCH length.

Example 87. The wireless device of any of Examples 80-84, wherein the UCI indicates one or more of: a first symbol of a corresponding PUSCH; an index to a predefined set of possible starting symbols of the corresponding PUSCH; a last symbol of the corresponding PUSCH; an index to a predefined set of possible last symbols of the corresponding PUSCH; and a length of the corresponding PUSCH.

Example 88. The wireless device of any of Examples 80-85, wherein: the first slot comprises one or more mini-slots; and each mini-slot comprises associated UCI.

Example 89. The wireless device of Example 78, wherein: the pattern of one or more demodulation reference signals associated with the first slot comprises a first pattern; and one or more of the pattern of one or more demodulation reference signals associated with the full slot and the pattern of demodulation reference signals associated with the last slot comprises a subset of demodulation reference signals included in the first pattern.

Example 90. The wireless device of Example 87, wherein the UCI indicates a length of the PUSCH.

Example 91. The wireless device of Example 87, wherein the UCI indicates a last symbol of the PUSCH.

Example 92. The wireless device of any of Examples 87-89, wherein a coded bit length of the UCI is independent of a length of the PUSCH.

Example 93. The wireless device of Example 87-89, wherein a coded bit length of the UCI assumes a predefined value for a PUSCH length.

Example 94. The wireless device of any of Examples 68-91, wherein the UCI includes an indication of where the PUSCH ends.

Example 95. The wireless device of Example 92, wherein the indication of where the PUSCH ends comprises at least one of: a length of the PUSCH; a symbol index where the PUSCH ends; and an index to a predefined set of possible ending points.

Example 96. The wireless device of any of Examples 68-93, wherein the UCI includes an index of a code block group (CBG).

Example 97. The wireless device of any of Examples 68-93, wherein the UCI includes a bitmap, wherein each bit of the bitmap corresponds to a CBG.

Example 98. The wireless device of any of Examples 68-95, wherein the one or more parameters comprise one or more of: a listen-before-talk (LBT) indication; a gap indication; a length of an upcoming downlink part in a shared channel occupancy time; and a channel occupancy time sharing indication.

Example 99. The wireless device of any of Examples 68-96, wherein the wireless device is further configured to: determine the UCI for the UL burst.

Example 100. The wireless device of any of Examples 68-97, wherein the wireless device is further configured to: configure the UL burst to be transmitted to the network node.

Example 101. A base station configured to: receive an uplink (UL) burst from a wireless device, the UL burst comprising UL control information (UCI) multiplexed in a Physical Uplink Shared Channel (PUSCH), the UCI carrying one or more parameters for unlicensed operation, the UL burst having an associated UL burst structure, the UL burst structure comprising a first slot, a full slot, and a last slot.

Example 102. The base station of Example 99, wherein the first slot comprises one or more mini slots.

Example 103. The base station of any of Examples 99-100, wherein Type B scheduling is used for Physical Uplink Shared Channel (PUSCH) transmission within the first slot.

Example 104. The base station of any of Examples 99-101, wherein PUSCH transmission occupies the full slot.

Example 105. The base station of any of Examples 99-102, wherein Type A scheduling is used for the full slot.

Example 106. The base station of any of Examples 99-102, wherein Type B scheduling is used for the full slot.

Example 107. The base station of any of Examples 99-104, wherein PUSCH transmission occupies less than all of the last slot.

Example 108. The base station of any of Examples 99-105, wherein the base station is further configured to transmit a configuration for one or more ending positions that apply to the last slot of the UL burst.

Example 109. The base station of any of Examples 99-106, wherein each of the first slot, the full slot, and the last slot comprise one or more demodulation reference signals.

Example 110. The base station of Example 107, wherein: the first slot comprises one or more mini-slots, and each mini-slot of the first slot comprises a single demodulation reference signal; the full slot comprises one or more slots, and each slot of the full slot comprises a single demodulation reference signal; and the last slot comprises a single demodulation reference signal.

Example 111. The base station of Example 108, wherein the base station is further configured to: determine a starting point of each slot and mini-slot based on detection of the demodulation reference signal in each respective slot and mini-slot.

Example 112. The base station of any of Examples 99-106, wherein each of the first slot, the full slot, and the last slot comprise an associated pattern of one or more demodulation reference signals.

Example 113. The base station of Example 110, wherein each associated pattern of one or more demodulation reference signals is indicative of a slot type, the slot type comprising one of the first slot, the full slot, and the last slot.

Example 114. The base station of Example 111, wherein: the pattern of one or more demodulation reference signals associated with the first slot indicates that the slot type is a first slot; the pattern of one or more demodulation reference signals associated with the full slot indicates that the slot type is a full slot; and the pattern of one or more demodulation reference signals associated with the last slot indicates that the slot type is a last slot.

Example 115. The base station of any of Example 111-112, wherein the base station is further configured to: detect the pattern of one or more demodulation reference signals in each of the first slot, the full slot, and the last slot; and determine the slot type based on the detected pattern of one or more demodulation reference signals in each of the first slot, the full slot, and the last slot.

Example 116. The base station of any of Examples 111-113, wherein the slot type is indicative of an associated mapping for a location of the UCI.

Example 117. The base station of Example 114, wherein the base station is further configured to: map the UCI to the PUSCH based on the detected slot type.

Example 118. The base station of Example 110, wherein each pattern of one or more demodulation reference signals associated with each of the first slot, the full slot, and the last slot is the same.

Example 119. The base station of Example 116, wherein the base station is further configured to map the UCI to the PUSCH based on a position of a first DMRS symbol in the pattern of one or more demodulation reference signals.

Example 120. The base station of any of Examples 116-117, wherein a coded bit length of the UCI is independent of a length of the PUSCH.

Example 121. The base station of any of Example 116-117, wherein a coded bit length of the UCI assumes a predefined value for a PUSCH length.

Example 122. The base station of any of Examples 116-119, wherein the UCI indicates one or more of: a first symbol of a corresponding PUSCH; an index to a predefined set of possible starting symbols of the corresponding PUSCH; a last symbol of the corresponding PUSCH; an index to a predefined set of possible last symbols of the corresponding PUSCH; and a length of the corresponding PUSCH.

Example 123. The base station of any of Examples 116-120, wherein: the first slot comprises one or more mini-slots; and each mini-slot comprises associated UCI.

Example 124. The base station of Example 121, wherein the base station is further configured to: detect one or more demodulation reference signals in the one or more mini-slots of the first slot in sequential order; decode a first UCI of the first mini slot of the one or more mini-slots of the first slot; and determine a start and end of the first mini-slot based on the decoded first UCI.

Example 125. The base station of Example 121, wherein the base station is further configured to: perform blind detection for UCI presence in a next symbol after each demodulation reference signal symbol in each mini-slot. The base station of Example 111, wherein: the pattern of one or more demodulation reference signals associated with the first slot comprises a first pattern comprising more than one demodulation reference signal; and one or more of the pattern of one or more demodulation reference signals associated with the full slot and the pattern of one or more demodulation reference signals associated with the last slot comprises a subset of demodulation reference signals included in the first pattern.

Example 126. The base station of Example 124, wherein the base station is further configured to: detect demodulation reference signals in the first pattern, the pattern of one or more demodulation reference signals associated with the full slot, and the pattern of one or more demodulation reference signals associated with the last slot; determine a number of demodulation reference signals in the first pattern, the pattern of one or more demodulation reference signals associated with the full slot, and the pattern of one or more demodulation reference signals associated with the last slot; and determine that the first pattern is associated with the first slot type based on the first pattern comprising a larger number of demodulation reference signals than the pattern of one or more demodulation reference signals associated with the full slot and the pattern of one or more demodulation reference signals associated with the last slot.

Example 127. The base station of any of Examples 124-125, wherein the UCI indicates a length of the PUSCH.

Example 128. The base station of any of Examples 124-125, wherein the UCI indicates a last symbol of the PUSCH.

Example 129. The base station of any of Examples 124-127, wherein a coded bit length of the UCI is independent of a length of the PUSCH.

Example 130. The base station of Example 124-127, wherein a coded bit length of the UCI assumes a predefined value for a PUSCH length.

Example 131. The base station of any of Examples 99-129, wherein the UCI includes an indication of where the PUSCH ends.

Example 132. The base station of Example 130, wherein the indication of where the PUSCH ends comprises at least one of: a length of the PUSCH; a symbol index where the PUSCH ends; and an index to a predefined set of possible ending points.

Example 133. The base station of any of Examples 99-131, wherein the UCI includes an index of a code block group (CBG).

Example 134. The base station of any of Examples 99-131, wherein the UCI includes a bitmap, wherein each bit of the bitmap corresponds to a CBG.

Example 135. The base station of any of Examples 99-133, wherein the UCI includes one or more parameters, the one or more parameters comprising one or more of: a listen-before-talk (LBT) indication; a gap indication; a length of an upcoming downlink part in a shared channel occupancy time; and a channel occupancy time sharing indication.

Example 136. A wireless device, the wireless device comprising: processing circuitry configured to perform any of the steps of any of the Group A Examples; and power supply circuitry configured to supply power to the wireless device.

Example 137. A base station, the base station comprising: processing circuitry configured to perform any of the steps of any of the Group B Examples; power supply circuitry configured to supply power to the base station.

Example 138. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A Examples; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example 139. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B Examples.

Example 140. The communication system of the pervious Example further including the base station.

Example 141. The communication system of the previous 2 Examples, further including the UE, wherein the UE is configured to communicate with the base station.

Example 142. The communication system of the previous 3 Examples, wherein: the processing circuitry of the host computer is configured to execute a host application, thereby providing the user data; and the UE comprises processing circuitry configured to execute a client application associated with the host application.

Example 143. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B Examples.

Example 144. The method of the previous Example, further comprising, at the base station, transmitting the user data.

Example 145. The method of the previous 2 Examples, wherein the user data is provided at the host computer by executing a host application, the method further comprising, at the UE, executing a client application associated with the host application.

Example 146. A user equipment (UE) configured to communicate with a base station, the UE comprising a radio interface and processing circuitry configured to performs the of the previous 3 Examples.

Example 147. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A Examples.

Example 148. The communication system of the previous Example, wherein the cellular network further includes a base station configured to communicate with the UE.

Example 149. The communication system of the previous 2 Examples, wherein: the processing circuitry of the host computer is configured to execute a host application, thereby providing the user data; and the UE's processing circuitry is configured to execute a client application associated with the host application.

Example 150. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A Examples.

Example 151. The method of the previous Example, further comprising at the UE, receiving the user data from the base station.

Example 152. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A Examples. The communication system of the previous Example, further including the UE.

Example 153. The communication system of the previous 2 Examples, further including the base station, wherein the base station comprises a radio interface configured to communicate with the UE and a communication interface configured to forward to the host computer the user data carried by a transmission from the UE to the base station.

Example 154. The communication system of the previous 3 Examples, wherein: the processing circuitry of the host computer is configured to execute a host application; and the UE's processing circuitry is configured to execute a client application associated with the host application, thereby providing the user data.

Example 155. The communication system of the previous 4 Examples, wherein: the processing circuitry of the host computer is configured to execute a host application, thereby providing request data; and the UE's processing circuitry is configured to execute a client application associated with the host application, thereby providing the user data in response to the request data.

Example 156. A method implemented in a communication system including a host computer, a base station and a user equipment (UE), the method comprising: at the host computer, receiving user data transmitted to the base station from the UE, wherein the UE performs any of the steps of any of the Group A Examples.

Example 157. The method of the previous Example, further comprising, at the UE, providing the user data to the base station.

Example 158. The method of the previous 2 Examples, further comprising: at the UE, executing a client application, thereby providing the user data to be transmitted; and at the host computer, executing a host application associated with the client application.

Example 159. The method of the previous 3 Examples, further comprising: at the UE, executing a client application; and at the UE, receiving input data to the client application, the input data being provided at the host computer by executing a host application associated with the client application, wherein the user data to be transmitted is provided by the client application in response to the input data.

Example 160. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B Examples.

Example 161. The communication system of the previous Example further including the base station.

Example 162. The communication system of the previous 2 Examples, further including the UE, wherein the UE is configured to communicate with the base station.

Example 163. The communication system of the previous 3 Examples, wherein: the processing circuitry of the host computer is configured to execute a host application; the UE is configured to execute a client application associated with the host application, thereby providing the user data to be received by the host computer.

Example 164. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A Examples.

Example 165. The method of the previous Example, further comprising at the base station, receiving the user data from the UE.

Example 166. The method of the previous 2 Examples, further comprising at the base station, initiating a transmission of the received user data to the host computer.

Example 167. A computer program, the program comprising instructions which when executed on a computer perform any one of the methods of Examples 1-31.

Example 168. A computer program product comprising a computer program, the program comprising instructions which when executed on a computer perform any one of the methods of Examples 1-31.

Example 169. A computer storage medium comprising a computer program, the program comprising instructions which when executed on a computer perform any one of the methods of Examples 1-31.

Example 170. A computer storage carrier comprising a computer program, the program comprising instructions which when executed on a computer perform any one of the methods of Examples 1-31.

Example 171. A computer program, the program comprising instructions which when executed on a computer perform any one of the methods of Examples 32-67.

Example 172. A computer program product comprising a computer program, the program comprising instructions which when executed on a computer perform any one of the methods of Examples 32-67.

Example 173. A computer storage medium comprising a computer program, the program comprising instructions which when executed on a computer perform any one of the methods of Examples 32-67.

Example 174. A computer storage carrier comprising a computer program, the program comprising instructions which when executed on a computer perform any one of the methods of Examples 32-67.

The invention claimed is:

1. A method performed by a wireless device, the method comprising:
    transmitting an uplink (UL) burst to a network node, the UL burst comprising UL control information, UCI, multiplexed in a Physical Uplink Shared Channel, PUSCH, the UCI carrying one or more parameters for unlicensed operation, the UL burst having an associated UL burst structure, the UL burst structure comprising a first slot, a full slot, and a last slot, wherein each of the first slot, the full slot, and the last slot comprise an associated pattern of one or more demodulation reference signals, each associated pattern of one or more demodulation reference signals being indicative of a slot type, the slot type comprising one of the first slot, the full slot, and the last slot.

2. The method of claim 1, wherein the first slot comprises one or more mini slots and Type B scheduling is used for PUSCH transmission within the first slot.

3. The method of claim 1, wherein the first slot and/or the last slot is the full slot.

4. The method of claim 1, wherein a PUSCH transmission occupies less than all of the last slot.

5. The method of claim 1 comprising receiving a configuration for one or more ending positions that apply to the last slot of the UL burst.

6. The method of claim 1, wherein:
    the first slot comprises one or more mini-slots, and each mini-slot of the first slot comprises a single demodulation reference signal;
    the full slot comprises one or more slots, and each slot of the full slot comprises a single demodulation reference signal; and
    the last slot comprises a single demodulation reference signal.

7. The method of claim 1, wherein:
    the pattern of one or more demodulation reference signals associated with the first slot indicates that the slot type is a first slot;
    the pattern of one or more demodulation reference signals associated with the full slot indicates that the slot type is a full slot; and
    the pattern of one or more demodulation reference signals associated with the last slot indicates that the slot type is a last slot.

8. The method of claim 1, wherein the pattern for the one or more demodulation reference signals is indicative of an associated mapping for a location of the UCI.

9. The method of claim 1, wherein each pattern of one or more demodulation reference signals associated with each of the first slot, the full slot, and the last slot is the same.

10. The method of claim 1, wherein:
    the pattern of one or more demodulation reference signals associated with the first slot comprises a first pattern; and
    one or more of the pattern of one or more demodulation reference signals associated with the full slot and the pattern of demodulation reference signals associated with the last slot comprises a subset of demodulation reference signals included in the first pattern.

11. A method performed by a base station, the method comprising:
    receiving an uplink, UL, burst from a wireless device, the UL burst comprising UL control information, UCI, multiplexed in a Physical Uplink Shared Channel, PUSCH, the UCI carrying one or more parameters for unlicensed operation, the UL burst having an associated UL burst structure, the UL burst structure comprising a first slot, a full slot, and a last slot, wherein each of the first slot, the full slot, and the last slot comprise an associated pattern of one or more demodulation reference signals, the method further comprising:
    detecting the pattern of one or more demodulation reference signals in each of the first slot, the full slot, and the last slot; and
    determining the slot type based on the detected pattern of one or more demodulation reference signals in each of the first slot, the full slot, and the last slot.

12. The method of claim 11, wherein the first slot comprises one or more mini slots.

13. The method of claim 11, wherein the first slot and/or the last slot is the full slot.

14. The method of claim 11, wherein a PUSCH transmission occupies less than all of the last slot.

15. The method of claim 11, further comprising transmitting a configuration for one or more ending positions that apply to the last slot of the UL burst.

16. The method of claim 11, further comprising determining a starting point of each slot and mini-slot based on detection of the demodulation reference signal in each respective slot and mini-slot wherein:
    the first slot comprises one or more mini-slots, and each mini-slot of the first slot comprises a single demodulation reference signal;
    the full slot comprises one or more slots, and each slot of the full slot comprises a single demodulation reference signal; and the last slot comprises a single demodulation reference signal.

17. The method of claim 11, wherein the pattern for the one or more demodulation reference signals is indicative of an associated mapping for a location of the UCI, and the method further comprises mapping the UCI to the PUSCH.

18. The method of claim 11, wherein:
the pattern of one or more demodulation reference signals associated with the first slot comprises a first pattern comprising more than one demodulation reference signal; and
one or more of the pattern of one or more demodulation reference signals associated with the full slot and the pattern of one or more demodulation reference signals associated with the last slot comprises a subset of demodulation reference signals included in the first pattern, the method further comprising:
detecting demodulation reference signals in the first pattern, the pattern of one or more demodulation reference signals associated with the full slot, and the pattern of one or more demodulation reference signals associated with the last slot;
determining a number of demodulation reference signals in the first pattern, the pattern of one or more demodulation reference signals associated with the full slot, and the pattern of one or more demodulation reference signals associated with the last slot; and
determining that the first pattern is associated with the first slot type based on the first pattern comprising a larger number of demodulation reference signals than the pattern of one or more demodulation reference signals associated with the full slot and the pattern of one or more demodulation reference signals associated with the last slot.

19. The method of claim 11, wherein
each PUSCH transmission has an associated UCI, and the method further comprises:
detecting one or more demodulation reference signals in the one or more mini-slots of the first slot in sequential order;
decoding a first UCI of the first mini slot of the one or more mini-slots of the first slot; and
determining a start and end of the first mini-slot based on the decoded first UCI.

20. The method of claim 19, further comprising performing blind detection for UCI presence in a next symbol after each demodulation reference signal symbol in each mini-slot.

21. A wireless device configured to handle communication of the wireless device in a wireless communication network, the wireless device comprising:
processing circuitry and memory having program instructions stored therein, the program instructions being executable by the processing circuitry to configure the wireless device to:
transmit an uplink, UL, burst to a network node, the UL burst comprising UL control information, UCI, multiplexed in a Physical Uplink Shared Channel, PUSCH, the UCI carrying one or more parameters for unlicensed operation, the UL burst having an associated UL burst structure, the UL burst structure comprising a first slot, a full slot, and a last slot, wherein each of the first slot, the full slot, and the last slot comprise an associated pattern of one or more demodulation reference signals, each associated pattern of one or more demodulation reference signals being indicative of a slot type, the slot type comprising one of the first slot, the full slot, and the last slot.

22. A base station configured to handle communication of a wireless device in a wireless communication network, the base station comprising:
processing circuitry and memory having program instructions stored therein, the program instructions being executable by the processing circuitry to configure the base to:
receive an uplink, UL, burst from a wireless device, the UL burst comprising UL control information, UCI, multiplexed in a Physical Uplink Shared Channel, PUSCH, the UCI carrying one or more parameters for unlicensed operation, the UL burst having an associated UL burst structure, the UL burst structure comprising a first slot, a full slot, and a last slot, wherein each of the first slot, the full slot, and the last slot comprise an associated pattern of one or more demodulation reference signals;
detect the pattern of one or more demodulation reference signals in each of the first slot, the full slot, and the last slot; and
determine the slot type based on the detected pattern of one or more demodulation reference signals in each of the first slot, the full slot, and the last slot.

* * * * *